United States Patent
Bhattacharyya et al.

(10) Patent No.: US 12,206,513 B2
(45) Date of Patent: Jan. 21, 2025

(54) POWER ALLOTMENT ADJUSTMENT IN A POWER SOURCING EQUIPMENT (PSE) OF A POWER OVER ETHERNET SYSTEM BASED ON EVENT DETECTION AT ANOTHER PSE

(71) Applicant: HEWLETT PACKARD ENTERPRISE DEVELOPMENT LP, Spring, TX (US)

(72) Inventors: Murari Bhattacharyya, Bangalore (IN); Nitin Duggal, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 75 days.

(21) Appl. No.: 18/324,551

(22) Filed: May 26, 2023

(65) Prior Publication Data
US 2024/0195643 A1  Jun. 13, 2024

(30) Foreign Application Priority Data
Dec. 7, 2022  (IN) .............................. 202241070658

(51) Int. Cl.
*H04L 12/10* (2006.01)
*G06F 1/26* (2006.01)

(52) U.S. Cl.
CPC .............. *H04L 12/10* (2013.01); *G06F 1/266* (2013.01)

(58) Field of Classification Search
CPC ..... H04L 12/10; H04L 43/10; H04L 41/0803; H04L 69/324; G06F 1/266; H04B 3/54
See application file for complete search history.

(56) References Cited

U.S. PATENT DOCUMENTS

| 8,594,854 B1* | 11/2013 | Tareen | H02J 13/0005 |
| | | | 700/297 |
| 9,847,884 B2 | 12/2017 | Balasubramanian | |
| 9,990,020 B2 | 6/2018 | Jain et al. | |
| 10,666,049 B2 | 5/2020 | Vavilala | |
| 10,996,724 B2 | 5/2021 | Koenen et al. | |
| 2007/0118772 A1* | 5/2007 | Diab | G06F 1/28 |
| | | | 713/300 |

(Continued)

FOREIGN PATENT DOCUMENTS

WO  2021/160551 A1  8/2021

*Primary Examiner* — Phil K Nguyen
*Assistant Examiner* — Brian J Corcoran
(74) *Attorney, Agent, or Firm* — Hewlett Packard Enterprise Patent Department

(57) ABSTRACT

A Power-over-Ethernet (POE) powered device (PD) may be coupled to two power sourcing equipments (PSEs), a PSE and an additional PSE. The PSE may exchange a transport layer protocol communications with the additional PSE. The communications comprising a first communication from the PSE to the additional PSE indicative of a PoE configuration of the PSE and a second communication from the additional PSE to the PSE indicative of a PoE configuration of the additional PSE. The PSE may create a power availability table based on the communications. The PSE may detect occurrence of an event comprising at least one of a change in the power availability table or a change in ability of the PSE to provide power to the PD. On occurrence of the event, the PSE may send additional communications to the additional PSE, requesting to adjust its power allotment for the PD.

20 Claims, 9 Drawing Sheets

(56) References Cited

U.S. PATENT DOCUMENTS

| | | |
|---|---|---|
| 2014/0040641 A1 | 2/2014 | Diab |
| 2014/0129853 A1 | 5/2014 | Diab et al. |
| 2016/0094350 A1* | 3/2016 | Picard ................ G06F 1/26 |
| | | 713/300 |
| 2017/0031406 A1* | 2/2017 | Teeter ................ G06F 1/28 |
| 2018/0131182 A1* | 5/2018 | Vavilala ............. H04L 12/10 |
| 2020/0159307 A1 | 5/2020 | Roy et al. |
| 2021/0091966 A1 | 3/2021 | Roy et al. |
| 2022/0011841 A1 | 1/2022 | Wee et al. |

* cited by examiner

POWER ALLOTMENT ADJUSTMENT IN A POWER SOURCING EQUIPMENT (PSE) OF A POWER OVER ETHERNET SYSTEM BASED ON EVENT DETECTION AT ANOTHER PSE

INTRODUCTION

Power-over-ethernet (POE) allows for data signals and electrical power supply signals to be communicated over the same single ethernet cable. This may allow a PoE-enabled electronic device to be communicably coupled to a network and to receive power via the same cable, which may provide more flexibility in how the device can be deployed (e.g., the device may no longer need to be positioned near a power outlet or have long power cables to reach such an outlet). Devices such as Voice over Internet Protocol (VoIP) phones, Light-Emitting Diode (LED) lights, Internet Protocol (IP) cameras, wireless access points (APs), and Bluetooth Low-Energy (BLE) beacons may be powered by PoE and can therefore be installed in locations where it would be impractical or expensive to install conventional wires or power supplies used to provide power.

In a PoE system, a device that provides the power to other devices via PoE is referred to as a Power Sourcing Equipment (PSE) and the devices that receive power from the PSE are referred to as Powered Devices (PD). The PSE generally also serves as a networking element, such as a switch or router. PDs may also be networking elements (e.g., a wireless access point, a PoE repeater/hub, etc.), network end points (e.g., a security camera, an internet-of-things (IoT) device, etc.), or any other electronic device with a PoE port.

BRIEF DESCRIPTION OF THE DRAWINGS

The present disclosure can be understood from the following detailed description, either alone or together with the accompanying drawings. The drawings are included to provide a further understanding of the present disclosure and are incorporated in and constitute a part of this specification. The drawings illustrate one or more examples of the present teachings and together with the description explain certain principles and operation. In the drawings.

DETAILED DESCRIPTION

Figure 1:
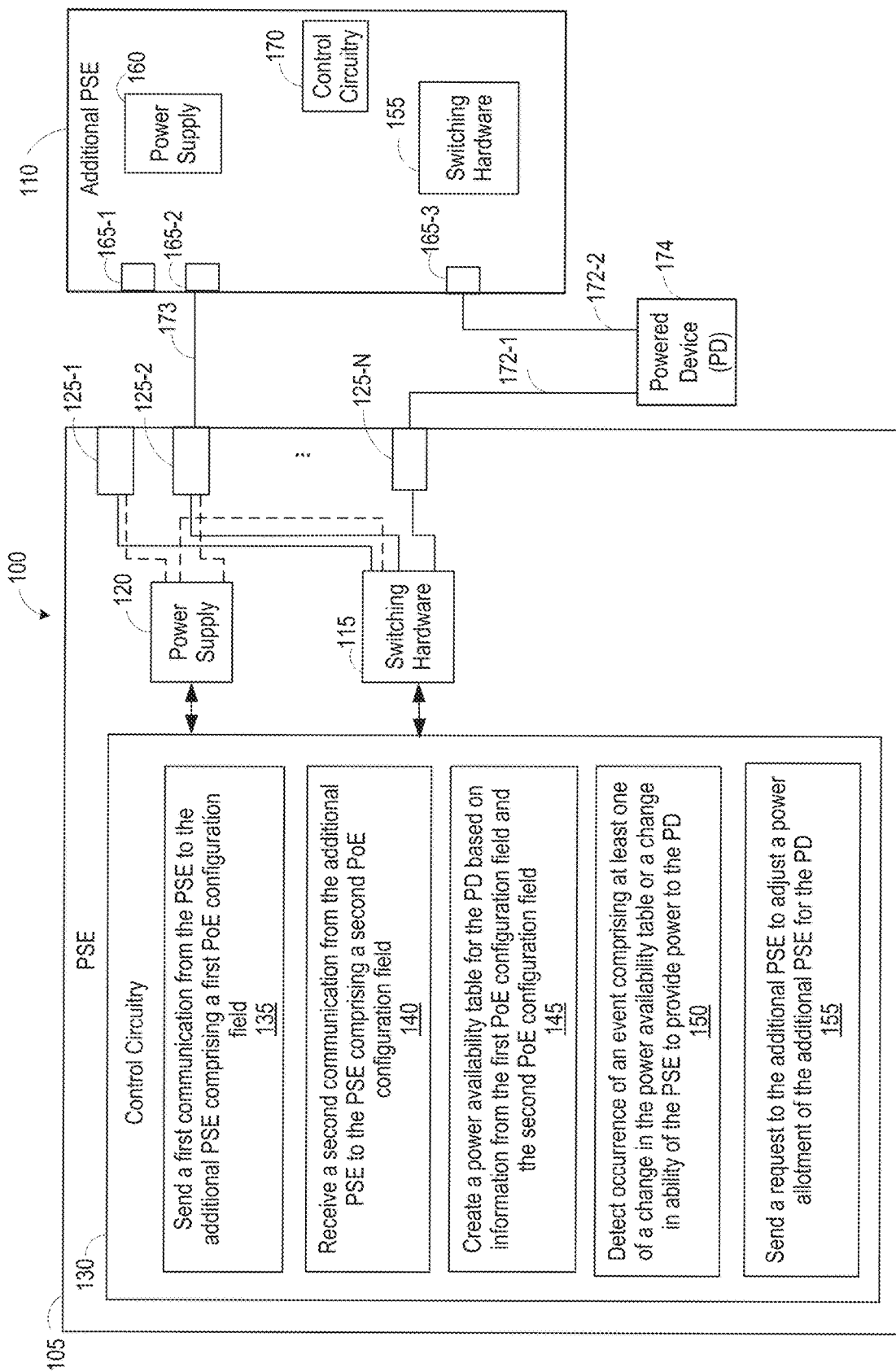
FIG. 1 is a block diagram illustrating a PoE system comprising two PSEs connected to a PD, according to an example.

Enterprise networks, data center networks (DCNs), and other types of computing networks are used to support a wide variety of organizations. Some of these networks or portions thereof are run by powered devices (PD) powered via Ethernet. Lapses in PoE for such PDs may lead to failure in PD operation due to lack of power supply and loss of connectivity in portions of these networks which may prove detrimental for such organizations. Therefore, reliability in operation of the PDs is often valued by businesses, universities, governments, hospitals, and other organizations that use such networks.

In an example configuration, to facilitate increased reliability, multiple PSEs are configured to supply power over ethernet to a single PD. In such a configuration, two PSEs may be connected to a single PD and the PD may be powered by both of these PSEs. In some cases, the two PSEs may both supply power to the PD concurrently, sharing the load between the two PSEs, while in other cases only one of the PSEs supplies power to the PD at a time. In either case, one PSE may serve as a backup for the other so that if one PSE cannot supply power to the PD, for example in case of failure of one PSE, or if one of the PSEs goes for maintenance or an upgrade, the other PSE may supply power to the PD.

Generally, for a PD powered by two PSEs, one PSE may act as a principal PSE and the other may act as an auxiliary PSE. The PD may communicate with the principal PSE to advertise its power requirements. The principal PSE has the primary responsibility of providing power over ethernet to the PD based on the advertised power requirements. In some cases, the PD may draw the required power from the principal PSE and, in case of a failure or shortage of power from the principal PSE, may draw power from the auxiliary PSE. Alternatively, in other cases the PD may draw a portion of the required power from the principal PSE and another portion of the required power from the auxiliary PSE. Which of these approaches to providing power to the PD is used may depend on the PoE configurations of the principal PSE and the auxiliary PSE. In addition, the amount of power allocated by each of the PSEs to the PD will also depend on the PoE configuration of each PSE. As used herein, the PoE configuration of a PSE refers to the attributes, components, and parameters/settings of the PSE that relate to or affect the capability of the PSE to provide PoE. For example, the PoE configuration of a PSE may include a firmware version of the PSE, a configuration of the ports of the PSE (e.g., which ports are PoE enabled, a PoE priority of each PoE enabled port, a PoE power allocation of each PoE enabled port, etc.), a configuration of the Power Supply Units (PSUs) of the PSE (e.g., which PSUs are connected to the PSE, a power output capacity of the PSUs, etc.), an aggregate PoE power budget, etc. Information characterizing or representative of the PoE configurations of the PSEs may be programmed into the principal and auxiliary PSE during installation, for example by an administrator, and this information be used by the principal and auxiliary PSEs to determine whether and how much PoE power they should supply to a PD.

In a system with two PSEs supplying power to the same PD, various circumstances may affect the ability of the principal PSE to supply power to the PD, such as by increasing or decreasing the allocation of power to the PD. In some cases, when such a change in the ability of the principal PSE to supply power occurs, the auxiliary PSE may not be aware of the change. Thus, the amount of power allocated by the auxiliary PSE for the PD might remain unchanged, but because the principal PSE's allocation has changed the total amount of power allocated to the PD may be too little or too much. A few examples of how this might occur are described below.

During operation, the PoE configuration of the principal PSE may undergo modifications. For example, PoE configuration modifications may include a change in power budget of the PSE, a change in port priority of one or more ports, a change in power allocation to one or more ports, a change in a number of PSUs connected to the PSE, and a change in type of PSUs connected to the PSE. These PoE configuration modifications in the principal PSE may lead to a change in flow of power from the principal PSE to the PD. However, the auxiliary PSE may remain unaware of such PoE configuration modifications at the principal PSE, and thus the auxiliary PSE may continue to allocate a same amount of PoE for the PD as was allocated before (i.e., the auxiliary PSE continues to allocate PoE power based on the predefined PoE configuration information programmed therein at the time of installation). Thus, the auxiliary PSE may allocate more power than is needed for the PD (e.g., if the change in PoE configuration resulted in the principal PSE supplying more power) or the auxiliary PSE may allocate insufficient power for the PD (e.g., if the change in PoE configuration resulted in the principal PSE supplying less power). Power shortage may result in inadequate power for operating the PD leading to power failures in the PD and surplus power allocation may result in wastage of PoE capabilities of the auxiliary PSE.

In another example, the principal PSE may undergo a maintenance event or experience a failure. Examples of the maintenance event may include a firmware update of the PSE, or a reboot of the PSE. The maintenance event or failure may also lead to a change in ability of the principal PSE to provide power to the PD.

One way to address the issues of PoE being oversupplied or undersupplied to a PD because one PSE is not aware of the changes at the other PSE is for a user (e.g., a network administrator) to manually reconfigure the auxiliary PSE when a change occurs at the principal PSE. For example, an administrator may monitor the performance of the principal PSE and the PD to identify the change in ability of the principal PSE and may make PoE configuration modifications in the auxiliary PSE to increase the power supplied by the auxiliary PSE to the PD. Thus, in order to maintain uninterrupted supply of power to the PD, manual effort of the administrator may be involved in identifying the decrease in flow of power from the principal PSE to the PD and making PoE configuration modifications in the auxiliary PSE to make up for the power deficit. Moreover, because this approach relies on user intervention, it can be susceptible to error—for example, the administrator may not identify the change in one PSE in sufficient time to avoid downtime of the PD.

In another approach to addressing the issues noted above, the PD may sense the decrease in flow of power from the principal PSE to the PD and request for additional power from the auxiliary PSE. However, relying on the PD in this manner to detect and react to a decrease in PoE supplied from the principal PSE is not always a reliable option to avoid undersupply of PoE, because the auxiliary PSE may affirm or refuse the request for additional power from the PD. In an example, the auxiliary PSE may affirm or refuse the request based on its surplus power availability. For example, if the auxiliary PSE has surplus power, it may affirm the request and provide the additional power to the PD and if the auxiliary PSE has no surplus power it may refuse the request. If the auxiliary PSE refuses the request, the PD may suffer from power shortage and may fail. Alternatively, the auxiliary PSE may arbitrarily decide to affirm or refuse the request for additional power. This is because, the auxiliary PSE is unaware of power availability and PoE configuration of the principal PSE. As an example, auxiliary PSE may be unaware of a time period for which it is expected to provide the additional power, whether the principal PSE can still supply a portion of the additional power and the auxiliary PSE can supply the remaining power, reliability of the principal PSE, etc. If the auxiliary PSE arbitrarily decides to refuse the request for additional power, the PD may fail due to power shortage. Thus, in case of a maintenance event, allocation of PoE for the PD by the auxiliary PSE, without considering the power availability and PoE configuration of the principal PoE, may result in power shortage leading to power failures in the PD.

To address the issues noted above, examples disclosed herein provide, among other things, for sharing information between principal and auxiliary PSEs related to their ability to supply PoE power to a PD. More specifically, the PSE's dynamically share information about their current PoE configuration, including changes to such PoE configurations. This allows one PSE to intelligently adjust its own power allocations and/or other settings in response to a change at the other PSE, such as a change in the PoE configuration of the other PSE. This may ensure that the amount of power allocated to the shared PD is not too much or too little, while also avoiding the need for an administrator to monitor the PSEs for changes and manually reconfigure the PSEs.

More specifically, in some examples disclosed herein two PSEs providing power supply to a PD may exchange a first set of transport layer protocol communications to create a power availability table based on the first set of communications. The power availability table refers to a tabular representation of information characterizing or representative of the PoE configurations of the two PSEs. Such information (also called PoE configuration information) may be programmed into the each of the two PSEs during installation or modified later during operation. The PoE configuration information of the two PSEs and modifications thereof may be captured/updated in the power availability table. The PSE's may periodically or episodically share communications to update the power availability table, which includes sharing changes in PoE configuration. In response to a change in the power availability table or a change in ability of one of the PSEs to provide power to the PD, the PSE may send a second set of transport layer protocol communications requesting the other PSE to adjust a power allotment of the other PSE for the PD. The other PSE may, in response to the second set of communications, change the power allocation for the PD as requested. Thus, power allotment of the PSEs to the PD may be dynamically adjusted considering PoE configuration modifications in the PSEs and ability of the PSEs to provide power to the PD such that uninterrupted supply of power to the PD is maintained.

In an example, a PSE may exchange a first set of transport layer protocol communications with an additional PSE. The additional PSE and the PSE are connected to a PD to provide PoE to the PD. The first set of transport layer protocol communications comprises a first communication from the PSE to the additional PSE comprising a first PoE configuration field comprising first PoE configuration data indicative of a PoE configuration of the PSE. PoE configuration refers to the attributes, components, and parameters/settings of the PSE that relate to or affect the capability of the PSE to provide PoE. For example, PoE configuration of a PSE may include PoE capabilities of the PSE (e.g., the number and types of PSUs that are part of the PoE, a PoE power budget, etc.) and connections and/or statuses and/or configuration of PoE capable ports of the PSE. The PoE configuration may further comprise PoE related settings of the PSE which may be factory-default or administrator-defined at a time of installation of the PSE. The first set of transport layer protocol communications further comprises a second communication from the additional PSE to the PSE comprising a second PoE configuration field comprising second PoE configuration data indicative of a PoE configuration of the additional PSE. The PSE may create a power availability table for the PD based on information from the first PoE configuration field and the second PoE configuration field, wherein the power availability table is indicative of availability of PoE for the PD from the PSE and the additional PSE. The PSE may detect occurrence of an event comprising at least one of a change in the power availability table or a change in ability of the PSE to provide power to the PD. The event may refer to change in PoE-related conditions/settings in either one of the PSEs connected to the PD which may affect the flow of power from either of the PSEs to the PD. Based at least in part on occurrence of the event, the PSE may send a second set of transport layer protocol communications to the additional PSE, the second set of transport layer protocol communications comprising a request to the additional PSE to adjust a power allotment of the additional PSE for the PD.

By creating the power availability table from PoE configurations of the PSE and the additional PSE and monitoring changes in the same, the PSE may decide whether any adjustment in power allotment for the PD is required due to any change in PoE configuration of either the PSE or the additional PSE. Thus, based on a change in the power availability table or a change in ability of the PSE to provide power to the PD, the PSE may send communications to the additional PSE requesting to adjust its power allotment for the PD. Consequently, by balancing the PoE power allotment between the PD and the additional PSE, the PSE may prevent failures in the PD due to power shortage at the PSE and allows efficient allocation of PoE. By avoiding power shortage uninterrupted supply of PoE to the PD may be maintained and with efficient PoE allocation PoE capabilities of PSE and the additional PSE may optimally utilized.

The above systems and methods are further described with reference to FIG. 1 to FIG. 7. It should be noted that the description and figures merely illustrate the principles of the present subject matter along with examples described herein and, should not be construed as a limitation to the present subject matter. It is thus understood that various arrangements may be devised that, although not explicitly described or shown herein, embody the principles of the present subject matter. Moreover, all statements herein reciting principles, aspects, and embodiments of the present subject matter, as well as specific examples thereof, are intended to encompass equivalents thereof.

Turning now to the figures, various devices, systems, and methods in accordance with aspects of the present disclosure will be described.

FIG. 1 is a block diagram conceptually illustrating two PSEs for use in a PoE system 100, in the form of PSE 105 and PSE 110. It should be understood that FIG. 1 is not intended to illustrate specific shapes, dimensions, or other structural details accurately or to scale, and that implementations of the PSE 105 and PSE 110 may have different numbers and arrangements of the illustrated components and may also include other parts that are not illustrated.

As shown in FIG. 1, the PSE 105 comprises switching hardware 115, a power supply 120, a plurality of PoE ports 125 ("ports 125"), and control circuitry 130.

The switching hardware 115 comprises switching circuitry that can selectively connect the ports 125 to one another and to one or more other ports (not illustrated) such as an uplink port to allow routing of data packets between the various devices connected to the PSE 105, as well as other related components that participate in, control, or otherwise facilitate the communication of the data packets.

The power supply 120 provides electrical power to the PSE 105, which includes power to run the functions of the PSE 105 itself and PoE power that is to be supplied by the PSE 105 to connected PDs via the ports 125. The power supply 120 may be controlled by the control circuitry 130 to selectively control the PoE power to the ports 125, or in other words the power supply 120 may increase or decrease the PoE power to certain ports 125 under the direction of the control circuitry 130 if needed (for example, during adjustment of power allotment of the PSE for the PD). The power supply 120 comprises one or more power supply devices that are configured to receive input power from a power source, such as mains power, and convert that power into forms suitable for use by the PSE 105. In an example, the power supply 120 may comprise, or may be connected to, one or more PSUs. The PSUs may be connected with a mains power. A PSU refers to a power source that supplies electric power to an electrical load. Examples of the PSU include Uninterruptible Power Supplies (UPS) and electric power converters. The power supply 120 may also comprise or be connected to multiple PSUs. Depending on the total input power received by the power supply 120, the control circuitry 130 may direct the power supply 120 to allocate the PoE power. The power supply devices of the power supply 120 may include an AC-to-DC converter, a DC-to-DC converter, protection devices (e.g., over-current protection, over-voltage protection, etc.), and/or other power components that participate in, control, or otherwise facilitate the supply of power to the PSE 105.

The ports 125 comprise PoE capable interfaces of the PSE 105, which may include, for example, RJ45 jacks. Each port 125 is configured to receive a connector of an ethernet cable, which may include an RJ45 connector. Each port 125 is coupled to the control circuitry 130 (e.g., via the switching hardware 115) and is configured to communicate data between the control circuitry 130 and a PD connected to the port 125. Each port 125 is also coupled to the power supply 120 and configured to supply PoE power from the power supply 120 to the PD coupled to port 125. In FIG. 1 three ports (i.e., ports 125_1, 125_2, 125_N) are shown, but any number of ports 125 equal to or greater than two may be included in the PSE 105. In some examples, the ports 125 may provide interfaces for connecting ethernet cables or other communication cables for communicating with the PSE 110. The PSE 105 may communicate with the PSE 110 via the ports 125 over a communications network, which may be a private network, such as a Local Area Network (LAN) or Wide Area Network (WAN), or a public network, such as the Internet.

The control circuitry 130 comprises circuitry configured (e.g., programmed) to perform operations 135 to 155. The control circuitry 130 comprises a processor and a storage medium storing instructions executable by the processor to cause operations 135 to 155 to be performed, dedicated hardware configured to perform operations 135 to 155, or some combination of these. In examples in which the control circuitry 130 comprises a processor, the processor may comprise one or more processing devices capable of executing machine readable instructions, such as, for example, a processor, a central processing unit (CPU), a controller, a microcontroller, a system-on-chip (SoC), a digital signal processor (DSP), a graphics processing unit (GPU), or other processing resources. In examples in which the control circuitry 130 includes dedicated hardware, in addition to or in lieu of the processor, the dedicated hardware may include any electronic device that is configured to perform specific operations, such as an Application Specific Integrated Circuit (ASIC), a Field Programmable Gate Array (FPGA), a Complex Programmable Logic Device (CPLD), discrete logic circuits, a hardware accelerator, a hardware encoder, etc. In some examples, the control circuitry 130 may be configured to control other operations of the PSE 105 in addition to the operations 135 to 155, such as controlling operations of the switching hardware 115, operations of the power supply 120, security/authentication operations, and/or other operations of the PSE 105.

As shown in FIG. 1, the additional PSE 110 comprises switching hardware 155, a power supply 160, a plurality of PoE ports 165 ("ports 165"), and control circuitry 170.

The switching hardware 155, power supply 160, ports 165, and control circuitry 170 of the additional PSE 110 are similar to switching hardware 115, a power supply 120, a plurality of PoE ports 125 ("ports 125"), and control circuitry 130, respectively, of the PSE 105.

As shown in FIG. 1, the PSE 105 and the additional PSE 110 are connected via respective communications links 172-1 and 172-2, collectively referred to as communications links 172, to PD 174 to supply PoE and exchange communications with the PD 174. The PSE 105 and the additional PSE 110 are connected to each other via a communications link 173. The communications link 173 connects a PoE capable port 125-2 of the PSE 105 with a PoE capable port 165-2 of the additional PSE 110. The communications link 173 may extend over a communications network, which may be a private network, such as a Local Area Network (LAN) or Wide Area Network (WAN), or a public network, such as the Internet.

The PD 174 may comprise control circuitry and one or more ports (not shown). The PD 174 may be any PoE capable electronic device, such as networking devices (e.g., wireless access points), IP telephones, IP security cameras, laptops, computer monitors, sales kiosks, sensors, other IoT devices, or any other PoE-capable electronic device.

Operation 135 that the control circuitry 130 is configured to perform comprises sending a first transport layer protocol communication from the PSE 105 to the additional PSE 110 comprising a first PoE configuration field comprising first PoE configuration data indicative of a PoE configuration of the PSE 105. Operation 140 that the control circuitry 130 is configured to perform comprises receiving a second transport layer protocol communication from the additional PSE 110 to the PSE 105 comprising a second PoE configuration field comprising second PoE configuration data indicative of a PoE configuration of the additional PSE 110. The first transport layer protocol communication and the second transport layer protocol communication may be collectively referred to as a first set of transport layer protocol communications. The operations 135 and 140 allow the PSE 105 to exchange the first set of transport layer protocol communications with the additional PSE 110 (via the ports 125). In some examples, PoE configuration of the PSE 105 comprises PoE capabilities of the PSE 105, where PoE capabilities of the PSE 105 comprise at least one of a power budget of the PSE 105, a firmware version of the PSE 105, or a configuration of PSUs of the PSE 105. In some examples, the PoE configuration of the PSE 105 comprises a configuration of PoE capable ports of the PSE 105, where the configuration of PoE capable ports of the PSE 105 comprises at least one of: a number of PoE capable ports, respective power allocations of the PoE capable ports, respective power consumption amounts of the PoE capable ports, respective port priorities of the PoE capable ports, or respective statuses of the PoE capable ports.

A management Internet Protocol (IP) address of the additional PSE 110 may be programmed in the PSE 105, for example via a network administrator manually entering the address or via an automated discovery process that occurs in response to the PSE 105 and additional PSE 110 being communicably coupled. The PSE 105 may be configured to send the first communication to the management IP address of the additional PSE 110. Management IP address refers to a unique identifier assigned to a network device for its remote management. The Management IP provides a web interface that enables to perform remote management tasks, troubleshoot a remotely managed system, and configure the network device. On sending the first communication, the PSE 105 may be configured to receive the second communication from the management IP address of the additional PSE 110. The PSE 105 may extract information from the first PoE configuration field and the second PoE configuration field to create a power availability table, as explained later. In some examples, the additional PSE 110 may also create the power availability table from the first PoE configuration field and the second PoE configuration field and share a copy of the same with the PSE 105. The decision as to which PSE is going to create the power availability table, depends on which one is being selected as the principal PSE. There are several approaches for selection of the principal PSE, some of which are elaborated later in the description.

In some examples, the transport layer protocol is Transmission Control Protocol (TCP)/Internet Protocol (IP) which is a collection of rules and procedures used to interconnect network devices on the internet. Generally, TCP/IP communications comprise an Ethernet Frame, which is a communication structure comprising a number of data fields formatted and ordered as specified in the TCP/IP protocol, including, for example, a source port, a destination port, followed by a number of mandatory Type Length Values (TLVs), followed (optionally) by optional TLVs. Preambles, end fields, and other encapsulation data may also be included.

TCP/IP communications generally comprise one or more TCP segments. A TCP segment generally consists of a header and a data section. The data section follows the header and is the payload data carried for the application/process. The header contains the source port and the destination port. The source port identifies the process that sent the data (i.e., payload in the TCP segment) and the destination port identifies the process that is to receive the data. In examples described herein, the destination port may be a well-known port or system port assigned, by convention, to a proprietary network process for communicating PoE-based configuration information between two PSEs. In an example, the proprietary network process for communicating PoE-based configuration information between two PSEs may be called an Inter PSE Communications Protocol (IPCP). IPCP refers to a set of rules/procedures for sharing and synchronizing PoE-related configuration information between two PSEs supplying PoE to a common PD and rules/procedures for PoE power balancing between the PSEs. Well-known ports or system ports may refer to the port numbers in the range from 0 to 1023 (0 to $2^{10}-1$), as defined by Internet Assigned Numbers Authority (IANA), that are used by system processes that provide different network services.

In some examples, the first communication from the PSE 105 to the additional PSE 110 comprises a first TCP segment carrying a payload to be delivered to a destination port (which is an assigned well-known port/system port) for an IPCP application/process. The payload in the first TCP segment may carry the first configuration field that, in an example, may be encoded as a Type-Length-Value (TLV). In some examples, the second communication from the additional PSE 110 to the PSE 105 comprises a second TCP segment carrying a payload to be delivered to the destination port (which is an assigned well-known port/system port) for the IPCP application/process. The payload in the second TCP segment may carry the second configuration field that, in an example, may be encoded as a Type-Length-Value (TLV). Note that the first and second PoE configuration fields may be instantiated using the same field (e.g., the same TLV), which may be referred to generically herein as a PoE configuration field. The terms "first" and "second" are used herein in relation to the PoE configuration fields to differentiate which PSE sent the communication of which the PoE configuration field is included—i.e., the first PoE configuration field refers to the PoE configuration field included in a communication from the PSE 105 and the second PoE configuration filed refers to the PoE configuration field included in a communication from the PSE 110. In some examples, the payload in the first TCP segment (of the first communication) from the PSE 105 to the additional PSE 110 comprises a number of TLVs, such as, the first PoE configuration field, Line card information, authentication information, principal/auxiliary selection information, and packet type. The line card information comprises line card numbers or port numbers of each PoE capable port or line card in the PSE 105. The line card number or port number may be manufacturer-specific. The authentication information may comprise Integrity Check Value (ICV) or checksum for determining integrity of the first communication. Using security algorithms or hashing techniques or secret keys, the authentication information may be generated. The packet type may indicate that the first communication is a "discovery initiation" packet sent by the PSE 105 to the additional PSE 110. The "discovery initiation" packet may be an indication to the additional PSE 110 that the PSE 105 intends to exchange the first set of transport layer protocol communications carrying PoE configuration information with the additional PSE 110. Thus, in response to receiving the "discovery initiation" packet, the additional PSE may check whether the additional PSE 110 has capabilities to share transport layer protocol communications carrying PoE configuration with the PSE 105. The principal/auxiliary selection information indicates that one of the PSE 105 or the additional PSE 110 is selected as a principal PSE. If the PSE 105 is selected as the principal PSE, it is responsible for carrying out the operations 145 to 155. The additional PSE 110 may be designated as an auxiliary PSE. While the principal PSE performs the operations 145 to 155, a copy of data (such as power availability table) generated and/or associated with these operations may be stored and periodically updated at the auxiliary PSE which acts as a backup.

In response to receiving the first communication from the PSE 105, the additional PSE 110 may check the packet type to identify that the first communication is a "discovery initiation" packet. On receiving the "discovery initiation" packet, the additional PSE 110 may check whether the additional PSE 110 has capabilities to send transport layer protocol communication carrying PoE configuration of the additional PSE 110 to the PSE 105. On determining that the additional PSE 110 has capabilities to send transport layer protocol communication carrying PoE configuration, the additional PSE 110 may send the second communication to the PSE 105. In some examples, the second communication from the additional PSE 110 to the PSE 105 comprises a source IP address followed by a number of TLVs, such as, the second PoE configuration field, Line card information, authentication information, principal/auxiliary selection information, and packet type. The source IP address refers to a management IP address of the additional PSE 110 from which the second communication originates. The line card information comprises line card numbers or port numbers of each PoE capable port or line card in the additional PSE 110. The line card number or port number may be manufacturer-specific. The authentication information comprises Integrity Check Value (ICV) or checksum for determining integrity of the second communication. Using security algorithms or hashing techniques or secret keys, the authentication information may be generated. The packet type may indicate that the second communication is a "discovery response" sent by the additional PSE 110 to the PSE 105 indicating that the additional PSE 110 has capabilities to share transport layer protocol communications carrying PoE configuration. The principal/auxiliary selection information indicates that one of the PSE 105 or the additional PSE 110 is selected as a principal PSE for carrying out the operations 140 to 150. Although, in the example of FIG. 1, the PSE 105 is selected as the principal PSE and the operations 145 through 155 are carried out by the PSE 105, in other examples, the additional PSE 110 may also be selected as the principal PSE. Consequently, the control circuitry 170 of the additional PSE 110 may also be configured to perform operations identical to the operations 135 to 155 performed by the control circuitry 130 of the PSE 105.

Operation 145 that the control circuitry 130 is configured to perform comprises creating a power availability table for the PD 174 based on information from the first PoE configuration field and the second PoE configuration field. The power availability table is indicative of availability of PoE for the PD 174 from the PSE 105 and the additional PSE 110. The power availability table may include information specifying the PoE configuration of the PSE 105 and the PoE configuration of the additional PSE 110. In an example, the power availability table may include a unique identifier for the PD 174 connected to the PSE 105 and the additional PSE 110, a port identifier and port priority of a PoE capable port of the PSE 105 connected to the PD 174, a port identifier and port priority of a PoE capable port of the additional PSE 110 connected to the PD 174, power consumption by the PD 174, and a power class of the PD 174. In an example, the unique identifier of the PD 174 may be a private IP address of the PD 174 or a manufacturer-specific custom address defined for PoE operations of the PD 174. In an example, the PSE 105 may send a copy of the power availability table to the additional PSE 110 and periodically update the copy of the power availability table based on the first PoE configuration field and the second PoE configuration field. Thus, the additional PSE 110 may also maintain the copy of the power availability table. In some examples, the additional PSE 110 may also create the power availability table from the first PoE configuration field and the second PoE configuration field and share a copy of the same with the PSE 105. The decision as to which PSE is going to create the power availability table, depends on which one is being selected as the principal PSE.

Operation 150 that the control circuitry 130 is configured to perform comprises detecting occurrence of an event comprising at least one of a change in the power availability table or a change in ability of the PSE 105 to provide power to the PD 174. In some examples, the power availability table comprises configuration of PoE capable ports of the PSE 105 and the additional PSE 110. Thus, any change in the configuration of the PoE capable ports of the PSE 105 or the additional PSE 110 may be reflected in the power availability table. On identifying such a change in the power availability table, the PSE 105 may determine that the event has occurred. For example, say, PoE functionalities of the PoE capable port of the additional PSE 110 connected to the PD 174 is disabled or port priority of the PoE capable port of the additional PSE 110 connected to the PD 174 is changed. The PSE 105 may identify such changes related to configuration of PoE capable ports of the PSEs from the power availability table and detect occurrence of the event. On the other hand, in some examples, changes in PoE capabilities of the PSE 105 (such as power budget of the PSE 105, a firmware version of the PSE 105, or a configuration of PSUs of the PSE 105) may not be reflected in the power availability table. Such changes in PoE capabilities of the PSE 105 may cause a change in ability of the PSE 105 to provide power to the PD 174. The control circuitry 130 may identify such changes in PoE capabilities of the PSE 105 and may detect occurrence of the event. Operation 150 may comprise monitoring for changes in the PoE configuration of the PSE 105 or the additional PSE 110 (which may be communicated to the PSE 105 via additional communications), and updating the power availability table (as applicable) in accordance with these changes in PoE configuration. In an example, a reduction in PoE port priority of a PoE capable port of the PSE 105 connected to the PD 174 may result in a change in the power availability table. Similarly, a reduction in PoE port priority of a PoE capable port of the additional PSE 110 (which change may be communicated to the PSE 105 via additional communications) may result in a change in the power availability table. The control circuitry 130 may be configured to detect occurrence of the event in response to such a change in the power availability table. In another example, a reduction in PoE power allocation of the PSE 105 may result in a change in ability of the PSE 105 to provide power to the PD 174, or similarly for a reduction in PoE power allocation of the additional PSE 110. The control circuitry 130 may detect occurrence of the event in response to such a reduction in PoE power allocation of the PSE 105. Similarly, for a reduction in PoE power allocation at the additional PSE 110, the control circuitry 170 may detect occurrence of the event in response to such a reduction. In an example, the change in ability of the PSE 105 to provide power to the PD 174 comprises a reduction in PoE power availability at the PSE 105. In some examples, the reduction in PoE power availability may be due to a change in power budget of the PSE 105 or reduction in share of PoE allocation for the PD 174 when multiple PDs are connected to PSE 105. In another example, the change in ability of the PSE 105 to provide power to the PD 174 comprises a reduction in a number of PSUs connected to the PSE 105 (or the number of connected PSUs that are operable). With reduction in the number of PSUs coupled to the PSE 105, the PSE 105 may detect that the total power supplied from the PSUs have reduced and consequently may modify its power budget. Modification of power budget by the PSE 105 may result in reduction in PoE power allocation of the PSE 105 for the PD 174 which may result in the change in ability of the PSE 105 to provide power to the PD 174. Such a change may be detected as an event by the PSE 105. Thus, the event may refer to change in PoE-related conditions/settings in the PSEs (such as the PSE 105 and the additional PSE 110) connected to a PD (such as the PD 174) which may affect the flow of power from either of the PSEs to the PD. In an example, the event may also refer to a fault in power hardware of the PSE, a firmware update, a maintenance operation (scheduled/unscheduled), or any other PoE related operation that may potentially interrupt the flow of power between the PSE and the PD.

Further, the control circuitry 130 is configured to check whether transport layer protocol communications comprising keep alive communications are exchanged between the PSE 105 and the additional PSE 110. The keep alive communications comprise a message sent by one device to another to check that the link between the two is operating, or to prevent the link from being broken. In an example, the transport layer protocol is TCP and the keep alive communications are IPCP keep alive messages exchanged between the IPCP application instances running in the PSE 105 and the additional PSE 110. An IPCP keep alive message comprises a "packet type" and a "time stamp". The packet type indicates that these are IPCP keep alive messages and the "timestamp" indicates a time when an IPCP keep alive message is transmitted. Based on the "timestamp" a subsequent IPCP keepalive message may be transmitted or the keep alive communications may be timed out, as the case may be. The PSE 105 and additional PSE 110 may be configured to send IPCP keep alive messages based on a keep alive time, a keep alive interval, and a keep alive retry parameter. Keep alive time is the duration between two keep alive transmissions in idle condition (which can be determined form the "timestamp"). Keep alive interval is the duration between two successive keep alive retransmissions, if acknowledgement to the previous keep alive transmission is not received. Keep alive retry is the number of retransmissions to be carried out before declaring that remote end is not available. In an example, if the additional PSE 110 goes for a scheduled maintenance activity, firmware update, or reboot, it may be unavailable or offline for some time and may not be able to send keep alive communications to the PSE 105 during that time. After a predefined keep alive retries by the PSE 105, the PSE 105 may detect that the additional PSE 110 is unavailable or offline and thus may detect occurrence of an event. Thus, when the additional PSE 110 goes for a scheduled maintenance activity, firmware update, or reboot an occurrence of an event may be detected by the PSE 105.

Operation 155 that the control circuitry 130 is configured to perform comprises sending, based at least in part on occurrence of the event, a second set of transport layer protocol communications to the additional PSE 110. The second set of transport layer protocol communications comprising a request to the additional PSE 110 to adjust a power allotment of the additional PSE 110 for the PD 174. In an example, the second set of transport layer protocol communications comprise a control communication to the additional PSE 110 indicating the additional PSE 110 to increase the power allotment of the additional PSE 110 for the PD 174, in response to the reduction in the number of PSUs connected to the PSE 105. The control communication may refer to an instruction, command, or request from the PSE 105 to the additional PSE 110, or vice versa, to carry out modifications in power allotment for the PD 174. In another example, the second set of transport layer protocol communications comprise a control communication to the additional PSE 110 indicating the additional PSE 110 to increase the power allotment of the additional PSE 110 for the PD 174, in response to the reduction in PoE power availability at the PSE 105.

In some examples, the control circuitry 130 may be configured to check, based on the second PoE configuration field received from the additional PSE 110, whether a port of the additional PSE 110 connected to the PD 174 has a high priority. In response to determining that the port of the additional PSE 110 does not have the high priority, the control circuitry 130 may be configured to send a control communication to the additional PSE 110 indicating the additional PSE 110 to increase port priority of the port. In response to determining that the port of the additional PSE 110 has the high priority, the control circuitry 130 may be configured to send another control communication to the additional PSE 110, where the other control communication is indicative of a request to the additional PSE 110 to increase the power allotment of the additional PSE 110 for the PD 174.

Further, in another example, responsive to detecting the event, the control circuitry 130 may be configured to send a first link layer protocol communication to the PD 174, where the first link layer protocol communication is indicative to the PD 174 that the PSE 105 is going under maintenance. The control circuitry 130 may be configured to send, a second link layer protocol communication to the PD 174, where the second link layer protocol communication is indicative of a request to the PD 174 to adjust at least one of power ask, PD signature configuration, and PD power class such that operation of the PD 174 is uninterrupted.

In some examples, the link layer protocol is Link Layer Discovery Protocol (LLDP). Generally, LLDP communications comprise an Ethernet Frame, which is a communication structure comprising a number of data fields formatted and ordered as specified in the LLDP protocol, including, for example, address fields (e.g., destination address, source address), followed by a number of mandatory TLVs (such as a Chassis ID TLV, a Port ID TLV, and so on), followed (optionally) by so-called optional TLVs. Preambles, end fields, and other encapsulation data may also be included. Some optional TLVs may be defined according to an industry standard, such as IEEE Std 802.1AB, while other optional TLVs may be so-called custom TLVs that may be manufacturer-specific. In some examples, power ask, PD signature configuration, and PD power class may be added as new optional TLVs to an LLDP frame (which may be either a standards-defined optional TLV or a manufacturer-specific custom TLV) of the second link layer protocol communication. In other examples, the link layer protocol may be Cisco Discovery Protocol (CDP), Foundry Discovery Protocol (FDP), Nortel Discovery Protocol (NDP), Link Layer Topology Discovery (LLTD), or other similar link-layer discovery protocols. Such other link-level discovery protocol also define communications data structures, like the Ethernet Frame described above, which comprise various data fields, like the TLVs described above, although the formatting, naming, and other details of the data structures may vary from one protocol to the other. Regardless of which protocol is used, power ask, PD signature configuration, and PD power class may be added to the communication structure thereof, as a new field or as a proprietary TLV.

The power ask refers to an average PoE power requirement of the PD for continuing its normal operations. This may be expressed in watts. PD signature refers to an operation configuration of a PD depending on which load, class, modes, and power characteristics of the PD may vary. A single signature PD may share the same detection signature, classification signature and maintain power signature (MPS) between both pairsets of a four pair Ethernet cable, whereas a dual-signature PD may have independent signatures between both pairsets. PD power class refers to a categorization of a PD based on the required power levels of the PD. The PoE IEEE standards define different classes for PDs based on the levels of power they require.

In addition to the operations described above, in some examples the control circuitry 130 of the PSE 105 may be configured to perform any of the operations described below in relation to the methods 300, 400, 500, and/or 600 of FIGS. 3-5 and 6. Certain aspects of the PSE 105 are further elucidated in FIG. 3, which depicts a PoE system in which the PSE 105 may be deployed. FIG. 3 is described below following the description of FIG. 2.

Figure 2:
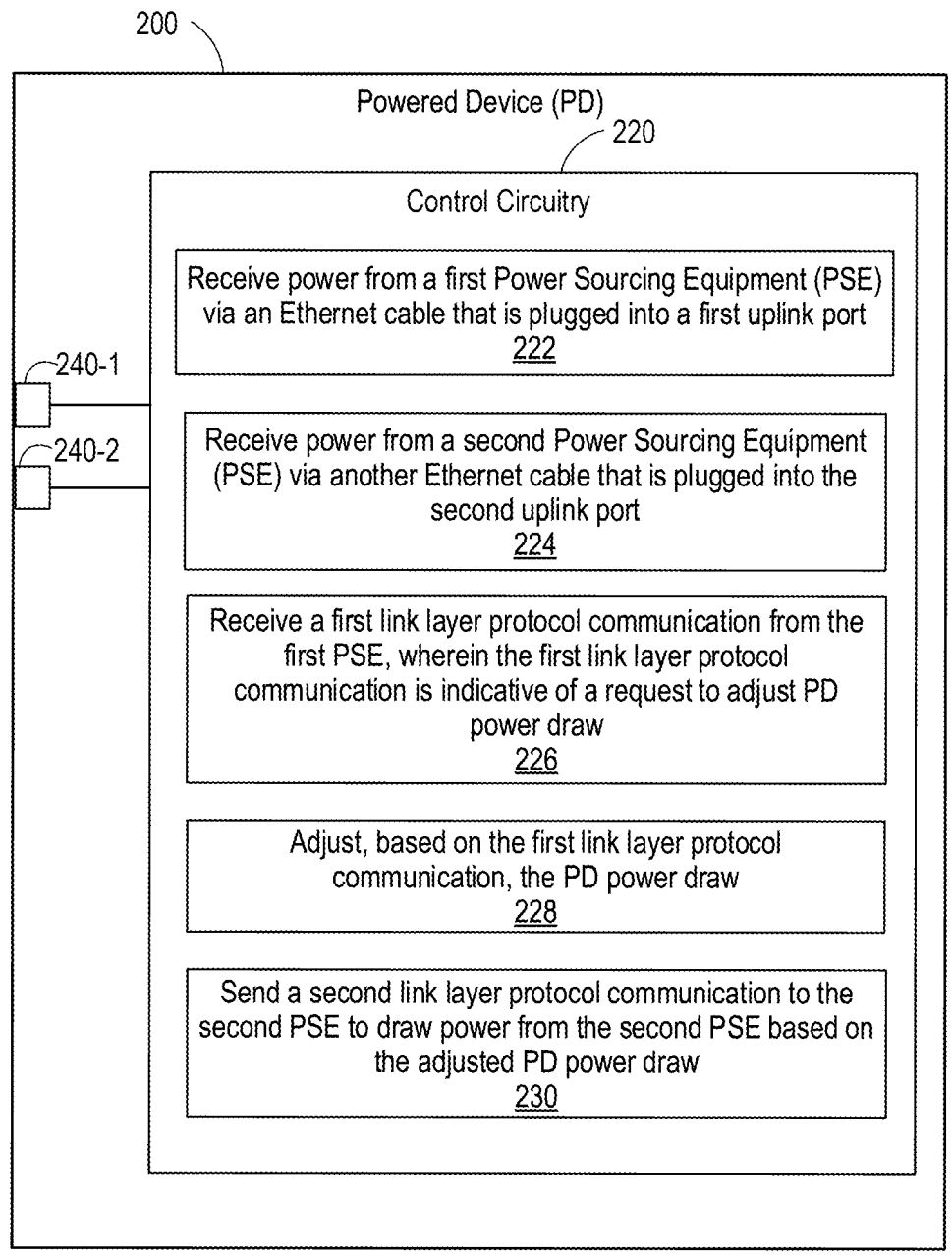
FIG. 2 is block diagram illustrating a PD connectable to two PSEs in a PoE system, according to an example.

Turning now to FIG. 2, a PD for use in a PoE system is described, in the form of PD 200. FIG. 2 is a block diagram conceptually illustrating the PD 200. It should be understood that FIG. 2 is not intended to illustrate specific shapes, dimensions, or other structural details accurately or to scale, and that implementations of the PD 200 may have different numbers and arrangements of the illustrated components and may also include other parts that are not illustrated.

As shown in FIG. 2, the PD 200 comprises control circuitry 220, a first uplink port 240-1 and a second uplink port 240-2, collectively referred to as uplink ports 240 (ports 240). An uplink port refers to an Ethernet port which is an interface used to connect a device to other network devices in a computer network, such as a local area network or a datacenter network. For example, a wireless access point in the access layer of a network may connect "up" to a network switch in the distribution layer via an ethernet cable connected to the uplink port of the wireless access point. The PD 200 may be any PoE capable electronic device, such as networking devices (e.g., wireless access points), IP telephones, IP security cameras, laptops, computer monitors, sales kiosks, sensors, other IoT devices, or any other PoE-capable electronic device.

The ports 240 comprise PoE capable ports, which may comprise RJ45 jacks. Each port 240 is configured to receive a connector of an ethernet cable, which may comprise an RJ45 connector. This allows the PD 200 to be coupled to a PSE, such as the PSE 105 and the additional PSE 110 described in FIG. 1. The ports 240 are configured to receive PoE power and supply the power to the other components of the PD 200. The ports 240 are also communicably coupled with the control circuitry 210 to communicate data between the control circuitry 220 and another device (such as a PSE) connected to the port 240. In FIG. 2 two ports 240 are shown, but any number of ports 240 equal to or greater than one may be included in the PD 200. Some PDs 200 have only one port 240. Others may have two ports 240 to allow the PD to be coupled to multiple networking devices (e.g., multiple PSEs), for example to provide redundancy. The PD 200 could also have more than two ports 240.

The control circuitry 220 comprises circuitry configured (e.g., programmed) to perform operations 222 to 230. The control circuitry 220 comprises a processor and a storage medium storing instructions executable by the processor to cause operations 222 to 230 to be performed, dedicated hardware configured to perform operations 222 to 230, or some combination of these. In this context, processor and dedicated hardware may include any of the examples discussed above in relation to the control circuitry 130 of FIG. 1. In some examples, the control circuitry 220 may be configured to control other operations of the PD 200 in addition to the operations 222 to 230, such as operations controlling communication of the PD 200 with the PSE (which may share commonalities among all types of PDs 200) as well as other operations that may be more specific to the functions of the various types of PD 200. Because the PD 200 can be any of a variety of devices with widely varying functions, the other operations performed by the control circuitry 220 may vary from one device to another. These other operations of PDs would be familiar to those of ordinary skill in the art and are not described herein.

Operation 222 comprises receiving power from a first PSE via an Ethernet cable that is plugged into the first uplink port 240-1. In an example, the first PSE may be PSE 105 of FIG. 1 and the ethernet cable may be plugged into an RJ45 connector at the first uplink port 240-1. The PD 200 may receive power over ethernet from the first PSE. When a PD connects to a PSE, such as PSE 105 of FIG. 1, the PSE and the PD may exchange information to dynamically determine the power allocation of the PSE for the PD. The PD may present a PD power class signature to the PSE. PD power class refers to a categorization of a PD based on the required power levels of the PD. Each PD power class signature corresponds to a maximum power delivered by the PoE port and a power range of the PD. The PSE responds with a power allocation based on the PD power class of the PD. Thus, the PD 200 may receive PoE from the first PSE via its first uplink port 240-1.

Operation 224 comprises receiving power from a second PSE via an Ethernet cable that is plugged into the second uplink port 240-2. In an example, the second PSE may be the additional PSE 110 of FIG. 1 and the ethernet cable may be plugged into an RJ45 connector at the second uplink port 240-2. Thus, the PD 200 may receive power over ethernet from the second PSE.

In an example, the first PSE and the second PSE connected to the ports 240 of the PD 200 may maintain a power availability table indicative of availability of PoE for the PD 200. The power availability table may be created based on PoE configuration of the first PSE and PoE configuration of the second PSE. The first PSE may monitor the power availability for any changes. Further, in some scenarios, the first PSE may be undergo a scheduled maintenance, a firmware upgrade or a reboot which may cause a change in ability of the first PSE to supply PoE to the PD 200. The first PSE may detect occurrence of an event in response to a change in the power availability table or a change in ability to provide PoE to the PD 200. In response to detecting occurrence of the event the first PSE may send a first link layer protocol communication to the PD 200. Operation 226 comprises receiving the first link layer protocol communication from the first PSE, in response to occurrence of the event comprising at least one of a change in a power availability table of the PD 200 or a change in ability of the first PSE to provide power to the PD 200. In an example, the PD 200 may receive the first link layer protocol communication from the first PSE. The first link layer protocol communication is indicative of a request to adjust PD power draw. PD power draw refers to power consumption by the PD 200 to maintain normal operations of the PD 200. In some examples, the first link layer protocol communication may be an LLDP frame including TLVs. The PD power draw may be added as a new optional TLV to the LLDP frame (which may be either a standards-defined optional TLV or a manufacturer-specific custom TLV) which may indicate that the PD power draw needs to be adjusted, i.e., either lowered or increased. In other examples, the PD power draw TLV may also indicate to adjust the PD power draw such that power drawn by the PD 200 from the first PSE is reduced by a certain amount and an equivalent amount of additional power is drawn from the second PSE. Thus, if the first PSE is unable to fulfill the power requirement of the PD 200, the PD 200 may request to the second PSE to draw the additional power from the second PSE and thereby maintain its operations without interruptions.

Operation 228 comprises adjusting, based on the first link layer protocol communication, the PD power draw. In an example, if the PD power draw TLV in the first link layer protocol communication indicates the PD 200 to reduce power drawn from the first PSE by a certain amount and to increase the power drawn from the second PSE by an equivalent amount, the control circuitry 220 may make modifications accordingly. In another example, in response to receiving the first link layer protocol communication, the control circuitry 220 is configured to switch the PD from a normal mode to a power save mode. The normal mode of the PD corresponds to a mode of higher power consumption by the PD 200 as compared to the power consumption by the PD 200 in the power saver mode. Thus, in the power saver mode, total power requirement of the PD 200 may be reduced which may result in reduction in total power requirement of the PD and thereby the power drawn from the first PSE may also reduce.

Operation 230 comprises sending a second link layer protocol communication to the second PSE to draw power from the second PSE based on the adjusted PD power draw. In particular, based on the adjusted power draw, the PD 200 may intend to draw additional power from the second PSE. In an example, the link layer protocol is LLDP. Thus, the second link layer protocol communication comprises an LLDP frame which may have a TLV indicating the second PSE of the PD's intention to draw additional power from the second PSE. The TLV may comprise an adjusted power requirement of the PD 200 from the second PSE. The second PSE may monitor for LLDP communications from the PD 200. In response to receiving, the second link layer protocol communication, the second PSE may allot the additional power to the PD 200 as per the adjusted power requirement thereby fulfilling the power requirement of the PD 200 and maintaining uninterrupted operations of the PD 200.

FIG. 3 illustrates a swim lane diagram of a method 300 for managing PoE supplied to a PD by two PSEs, according to an example. The method 300 includes operations 308 to 354 performed by a PSE 302, an additional PSE 304, and a PD 306, where the PD 306 is connected to the PSE 302 and the additional PSE 304 to receive PoE. The PSE 302 may perform similar functionalities as those of PSE 105 of FIG. 1, the additional PSE 304 may perform similar functionalities as those of additional PSE 110 of FIG. 1, and the PD 306 may perform similar functionalities as those of PD 174 of FIG. 1 or those of PD 200 of FIG. 2. Some aspects of the PSE 105, additional PSE 110, and PD 200 that were described above are not shown in FIG. 3. In addition, descriptions of certain aspects shown in FIG. 3 that were already described above in relation to FIGS. 1 and 2 may be omitted below.

As may be understood, the PD 306 may be communicatively coupled to the PSE 302 and the additional PSE 304 via respective Ethernet cables which are plugged into respective ports of the PSE 302 and the additional PSE 304. The PD 306, when connected to a PoE capable port of the PSE 302, may send a class signature to the PSE 302, at block 308. The class signature may define a required power level for the PD 306. At block 310, the PSE 302 responds with a power allocation based on the class signature of the PD 306. In an example, the PSE 302 may send an LLDP communication to the PD 306 with a maximum power delivered by the PoE enabled port of the PSE 302. The maximum power delivered corresponds to the class signature of the PD 306.

During operation, at block 312, the PSE 302 may send a first communication 313 to the additional PSE 304. The first communication 313 may be a transport layer protocol communication. In particular, the first communication 313 may be a TCP/IP communication from the PSE 302 to the additional PSE 304, carrying a payload to be delivered to a destination port assigned to an IPCP application instance running at the additional PSE 304. The first communication may be sent to identify whether the PSE 302 and the additional PSE 304 have the capabilities to share TCP/IP communication for exchange of PoE configuration information using IPCP. In an example, the PSE 302 may send the first communication 313 to the additional PSE 304 via a PoE peer connection. The PoE peer connection refers to a point-to-point connection between an application instance running IPCP at the PSE 302 and an application instance running IPCP at the additional PSE 304 for sharing PoE configuration, where the point-to-point connection is established using TCP. Once, the point-to-point connection between the PSE 302 and the additional PSE 304 for sharing PoE configuration is established, the PSE 302 and the additional PSE 304 may be referred to as an IPCP peer in relation to the other. Thus, two PSEs may be referred to as "IPCP peers" when they can exchange transport layer messages to synchronize PoE related configurations between them. As shown in FIG. 3, the first communication 313 comprises an ethernet frame with a source address 313-*a*, PoE capabilities TLV 313-*b*, line card information TLV 313-*c*, authentication information TLV 313-*d*, principal select TLV 313-*e*, and packet type TLV 311-*f*. The source address 313-*a* refers to an IP address of the PSE 302 from which the first communication originates. The PoE capabilities TLV 313-*b* refers to PoE related configuration of the PSE 302. The PoE capabilities TLV 313-*b* comprise at least one of a "power budget" of the PSE 302, a "firmware information" of the PSE 302, or a configuration of PSUs of the PSE 302. An example PoE capabilities TLV 313-*b* is shown below:

"PSU Configuration
  PSU: SLOT: 1 POWER: 900 W STATUS: Online
  PSU: SLOT 2: POWER:900 W STATUS: Online
  Power redundancy: Enabled.
Firmware Info
  Firmware <name><version><Maximum power><class>
Power Budget:
  Power Supplied: 900 W
  Board power: 600 W
  PoE power: 300 W
  POE Mode: BT
  Used POE power: 270 W
  Unutilized POE power: 30 W In the example PoE capabilities TLV 313-*b*, configuration of PSUs of the PSE 302 is represented by "PSU CONFIGURATION. In the example, it may be seen that there are two PSU connected to the PSE 302, at "SLOT1" and "SLOT2", each of which may provide 900 watts (W) of ac power supply and are currently "online", i.e., under operation. The "Power Budget" is an example power budget of the PSE 302 that may be included in the PoE capabilities TLV 313-*b*. In the above example, the "power budget" indicates that the total supply power is 900 W. The "board power" refers to the power reserved for the operations of the device itself, i.e., the PSE 302 in this case. Thus, the amount of PoE power that may be allocated is referred to as "PoE power" which equals (900-600)=300 W. Out of the board power, the amount of power consumed by the PSE 302 is referred to as the non-PoE power consumed by the PSE 302. The total amount of PoE power consumed by PDs connected to the PSE 302 is referred to as "Used PoE power" which is 270 Watts in this example. Thus, the "Unutilized PoE power" is (300-270)=30 W. The "firmware info" includes information on firmware name, version, maximum power that the PoE controller can handle, and the classification of the PD 306 connecting to the PSE 302.

The line card information TLV 313-*c* refers to a TLV specifying line card numbers or port numbers of PoE capable ports of the PSE 302 and the total count of such ports. The authentication information TLV 313-*d* refers to rules for data protection used for encoding the first communication. The principal select TLV 313-*e* carries information identifying which of the PSE 302 and the additional PSE 304 is selected as a principal PSE. The selection of the principal PSE and the auxiliary PSE may be performed manually by an administrator or through an election mechanism. In manual selection, while configuring a PSE, the administrator may designate the PSE as the principal PSE. The PSE designated as the principal PSE may send the principal select TLV 313-*e* carrying a specific value that indicates that the sender is the principal PSE. In the election mechanism, a PSE can check its PSU configuration (whether it has multiple PSUs which are online and healthy), available PoE power, whether a maintenance/firmware upgrade is scheduled, etc., to claim to be the principal PSE. If there are multiple redundant PSUs connected to the PSE, available PoE power is sufficient, and no upcoming maintenance/firmware upgrade is scheduled, then the PSE may claim to be the principal PSE and send the principal select TLV 313-*e* indicating the same. Thus, in an example, if the PSE 302 has a higher number of PSUs connected to it than those connected to additional PSE 304 and an amount of PoE power remaining in the PSE 302 is higher than a threshold, the PSE 302 may send the principal select TLV 313-*e* indicating that the PSE 302 is the principal PSE. The packet type TLV 313-*f* indicates that the first communication is a "discovery initiation" packet. A "discovery initiation" packet indicates to the intended receiver (the additional PSE 304 in this case), that the source (i.e., the PSE 302) intends to exchange transport layer protocol communications to share PoE configurations with the receiver and enquires whether the receiver has capabilities to perform such exchange.

Figure 3A:
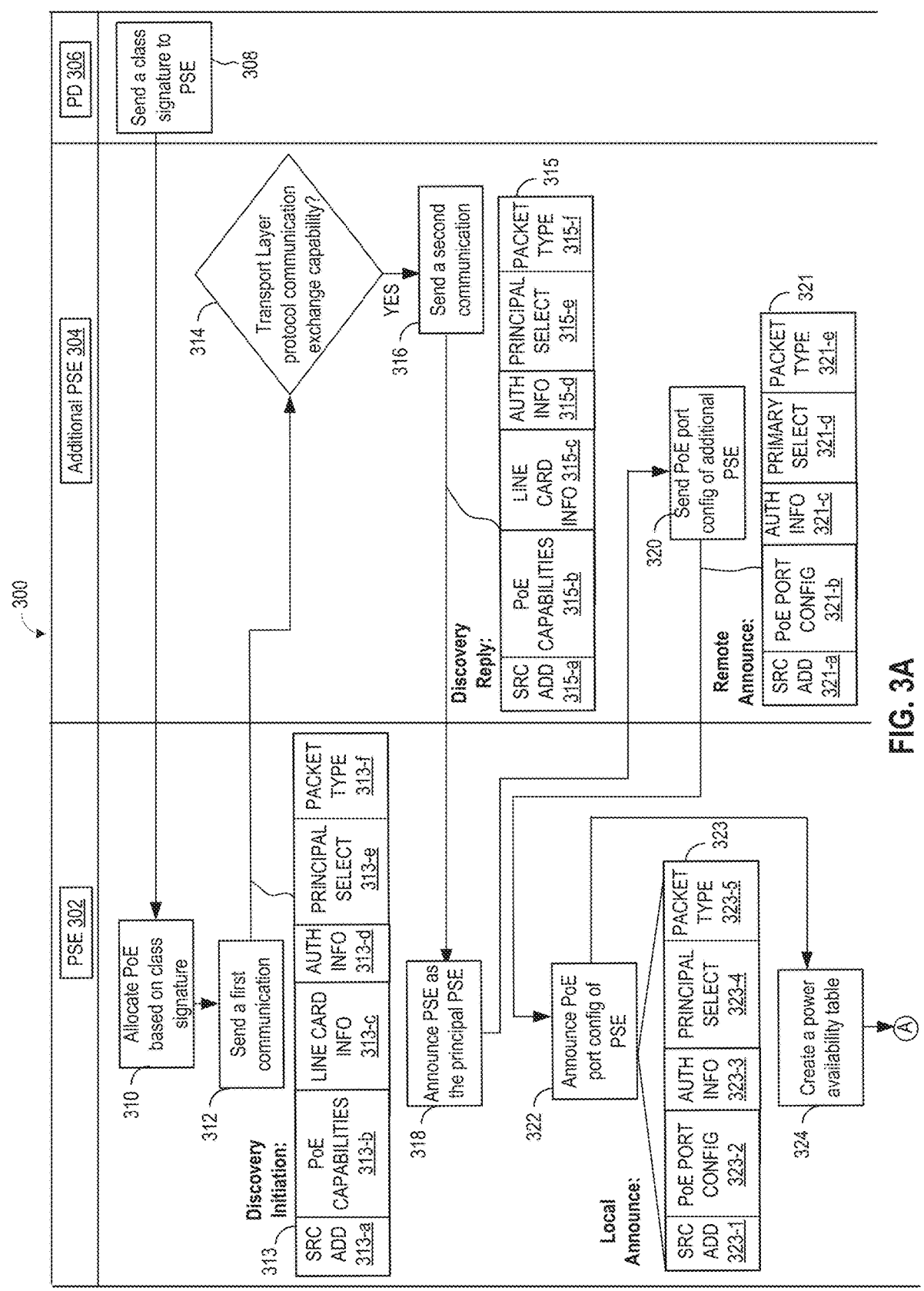
FIG. 3 is a swim lane diagram illustrating a process for managing PoE supplied to a PD connectable two PSEs in a PoE system, according to an example.
Figure 3B:
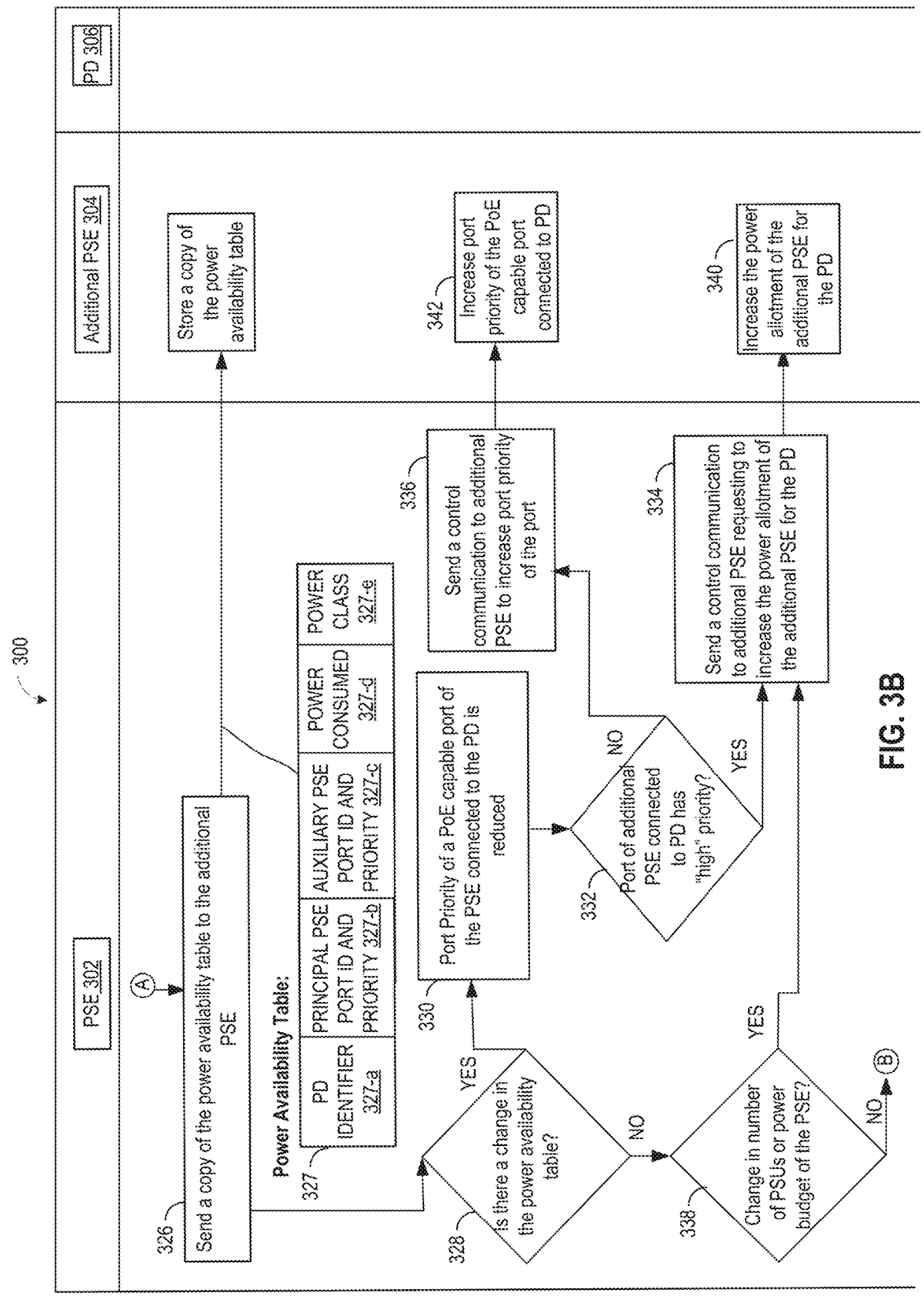
Figure 3C:
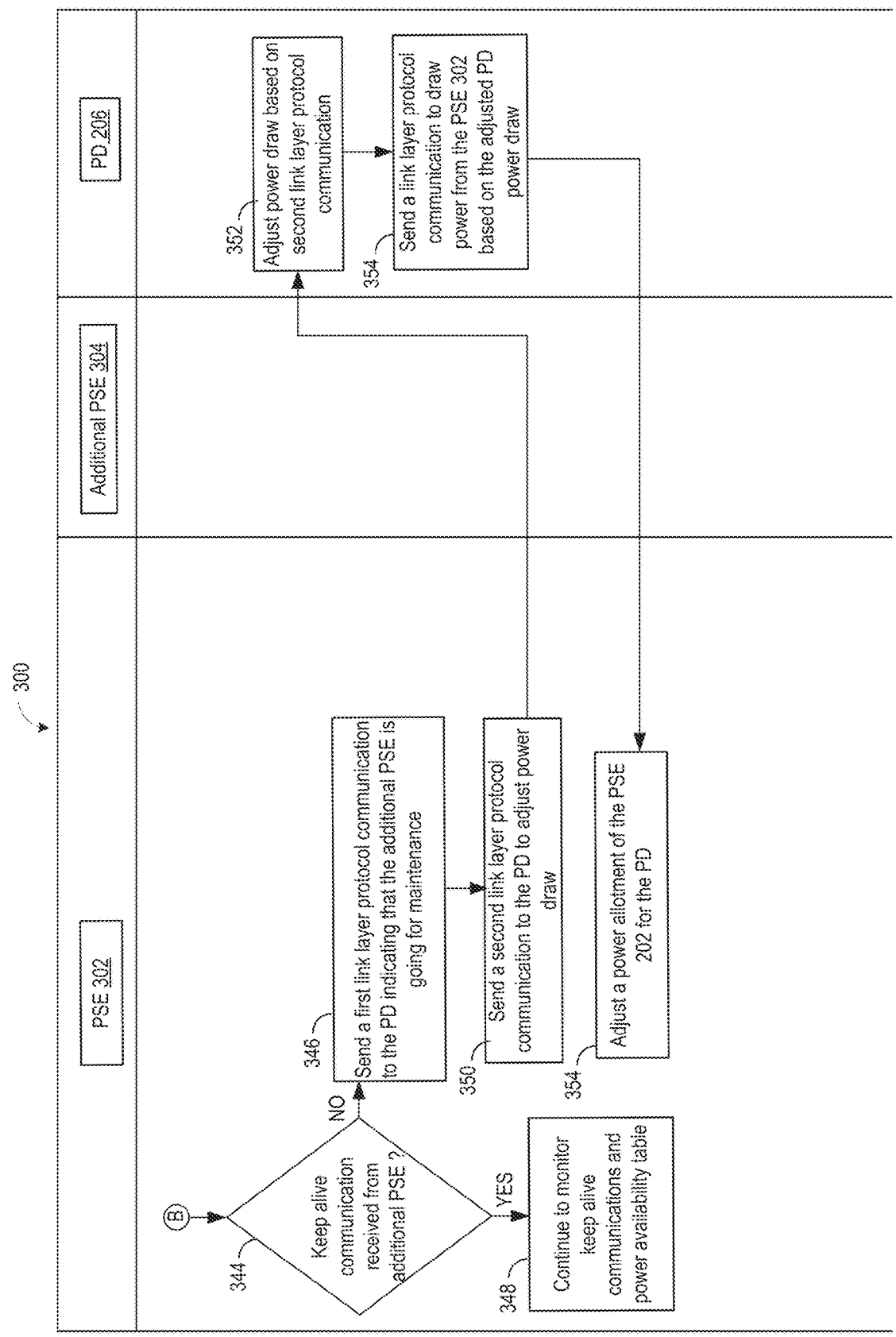

In some examples, in response to receiving the first communication, the additional PSE may first send a discovery acknowledgement packet (Disc ACK) back to the PSE 302 (not sown in FIG. 3A). The "Disc ACK" may be a confirmation message from the additional PSE 304 to the PSE 302, that the additional PSE 304 has received the "discovery initiation" packet. Further, the additional PSE 304 may analyze the first communication. In an example, the analysis of the first communication may include, the additional PSE 304 checking the packet type TLV 313-*f* to identify that the first communication is a "discovery initiation" packet and subsequently a control circuitry of the additional PSE 304 may gather PoE configuration of the additional PSE 304 to respond to the first communication. At block 314, the additional PSE 304 may check whether the additional PSE 304 has capabilities to exchange transport layer protocol communications with the PSE 302 to exchange PoE configurations. In particular, the additional PSE 304 may check whether an application instance of IPCP is running in the additional PSE 304. Further, in the analysis the additional PSE 304 may also check the principal select TLV 313-*e* in the first communication, in order to determine which one of the PSE 302 and the additional PSE 304 should act as a principal PSE and/or as an auxiliary PSE. In this example, based on the principal select TLV 313-*e*, the additional PSE 304 may identify that PSE 302 is the principal PSE and the additional PSE 304 is the auxiliary PSE. In response to determining that the additional PSE 304 has capabilities to exchange transport layer protocol communication with the PSE 302, the additional PSE 304 may send a second communication 315 to the PSE 302, at block 316. The second communication 315 may be a transport layer protocol communication. In particular, the second communication 315 may be a TCP/IP communication, from the additional PSE 304 to the PSE 302, carrying a payload to be delivered to a destination port assigned to an IPCP application instance running at the PSE 302. The second communication may be sent to indicate to the PSE 302 that the additional PSE 304 has the capabilities to share TCP/IP communications for exchange of PoE configuration information using IPCP. The second communication 315 comprises a source address field 315-*a* comprising an IP address of the additional PSE 304, a PoE capabilities TLV 315-*b* comprising a PoE configuration of the additional PSE 304, line card information 315-*c* comprising line card numbers of PoE capable line cards and a total count of a number of PoE capable line cards in the additional PSE 304, authentication information TLV 315-*d* comprising rules for data protection used for encoding the second communication, a principal select TLV 315-*e* carrying information identifying which of the PSE 302 and the additional PSE 304 is selected as a principal PSE, and a packet type TLV 315-*f* identifying that the second communication is a "discovery reply". The "discovery reply" packet may indicate that the additional PSE 304 is connected to the PSE 302 to exchange IPCP data packets using TCP. Once the "discovery reply" packet is received by the PSE 302, a point-to-point link for exchange of IPCP messages between to the PSE 302 and the additional PSE 304 may be established. Thus, on receiving the "discovery reply" packet, the PSE 302 and the additional PSE 304 may be established as an "IPCP peer" in relation to the other. Thus, after the "discovery reply" is received by the PSE 302, the PSE 302 and the PE304 may be understood to be in an "IPCP peer established" state. The "IPCP peer established" state refers to an operational state of a PSE in which the PSE can communicate with its "IPCP peer" over a point-to-point network connection. Although, in the example of FIG. 3, the PSE 302 is selected as the principal PSE, in other examples, the additional PSE 304 may also be selected as the principal PSE. Consequently, the control circuitry of the additional PSE 304 may also be configured to perform operations identical to those performed by the control circuitry of the PSE 302.

In an example, in response to receiving the second communication from the additional PSE 304, the PSE 302 may identify from the principal select TLV 315-*e* that the PSE 302 is selected as the principal PSE. Thus, on receiving the second communication, the PSE 302 may announce that the PSE 302 is the principal PSE, at block 318. Once the PSE 302 is announced as the principal PSE, the additional PSE 304 may send a configuration of PoE capable ports of the additional PSE 304 to the PSE 302, at block 320. In an example, the additional PSE 304 may send the configuration of PoE capable ports of the additional PSE 304 to the PSE 302 via a transport layer protocol communication similar to the second communication. The transport layer protocol communication comprises an ethernet frame, also referred to as a remote announce packet, such as the remote announce packet 321. The remote announce packet may refer to a TCP/IP packet for sharing configuration of PoE capable port of one PSE with another. The remote announce packet 321 may be similar to the second communication and comprises a source address 321-*a*, a PoE port configuration TLV 321-*b*, an authentication information TLV 321-*c*, a principal select TLV 321-*d*, and a packet type TLV 321-*e*. The authentication information TLV 319-*c* and the principal select TLV 319-*d* may be identical to the authentication information TLV 315-*d* and the principal select TLV 315-*e* of the second communication 315. The packet type TLV 321-*e* indicates that this ethernet frame is a TCP/IP communication comprising configuration of PoE capable ports of the additional PSE 304. An example of the PoE port configuration TLV 321-*b* is [port -ge-0/0/0, PD identifier=floor5-1, port priority=high, Power consumed=11.5 W, Power Class: Class A]. "ge-0/0/0" refers to a port address of a PoE enabled port of the additional PSE 304, "floor5-1" refers to a unique identifier of the additional PSE 304, "high" refers to the port priority of the port "ge-0/0/0". In an example, PoE port priority for an interface may specify "critical", "high", or "low" which indicates an order of preference or rank of the interface in the event of power over-subscription. Power over-subscription in a PSE may refer to a phenomenon where more PDs are connected to the PSE than allowed by the power budget of the PSE. Thus, if the total power required by PDs connected to a PSE is more than the total PoE power available at the PSE, it may lead to power over-subscription. In an example, in case of power over-subscription, higher priority ports have greater precedence over lower priority ports. Thus, during over-subscription, PoE capable ports having higher power-priority are provided a PoE power supply while the lower priority ports may not have a PoE power supply. "Power consumed" refers to PoE power consumed by the PD connected to the port "ge-0/0/0" and "power class" refers to a category of the PD connected to the PSE which indicates a maximum power requirement of the PD. The packet type TLV 321-*e* may identify the packet as a "remote announce" packet which shares the configuration of PoE capable ports of the additional PSE 304 with the PSE 302. Although, configuration of a single PoE capable port "ge-0/0/0" of the additional PSE 304 is illustrated above, the PoE port configuration TLV 321-*b* may include configuration of other PoE capable ports of the additional PSE 304.

In response to receiving the configuration of PoE capable ports of the additional PSE 304, the PSE 302 may announce the configuration of PoE capable ports of the PSE 302, at block 322. In an example, the PSE 302 may publish the configuration of PoE capable ports of the PSE 302 in an ethernet frame, also referred to as a local announce packet, such as the local announce packet 323. In an example, the control circuitry of the PSE 302 may gather the configuration of all PoE capable ports of the PSE 302 to create the local announce packet 323. The local announce packet 323 comprises a source address 323-*a*, a PoE port configuration TLV 323-*b*, an authentication information TLV 323-*c*, a principal select TLV 323-*d*, and a packet type TLV 323-*e*. The authentication information TLV 323-*c* and the principal select TLV 323-*d* may be similar to authentication information TLV 313-*d* and the principal select TLV 313-*e* of the first communication 313. The packet type TLV 323-*e* indicates that this ethernet frame comprises configuration of PoE capable ports of the PSE 302. The packet type TLV 323-*e* may identify the packet as a "local announce" packet via which the configuration of PoE capable ports of the PSE 302 are locally published within the PSE 302. Although in the example of FIG. 3, the operations of the blocks 312 and 322 are shown to be separate, in an example, the operations of the block 312 and 322 may be performed jointly and the local announce packet may form a part of the discovery initiation packet. Likewise, although in the example of FIG. 3, the operations of the blocks 316 and 320 are shown to be separate, in an example, the operations of the block 316 and 320 may be performed jointly and the remote announce packet may form a part of the discovery initiation packet.

In response to receiving the configuration of the PoE capable ports of the additional PSE 304 from the remote announce packet and the configuration of the PoE capable ports of the PSE 302 from the local announce packet, the PSE 302 may create a power availability table, at block 324. The power availability table comprises PoE availability information for the PD 306 based on the configuration of the PoE capable ports of the PSE 302 and the additional PSE 304. At block 326, the PSE 302 may send a copy of the power availability table to the additional PSE 304. An example power availability table 327 is shown in FIG. 3. The power availability table 327 comprises a PD identifier 327-a, principal PSE port id and priority 327-b, secondary PSE port id and priority 327-c, power consumed 327-d, power class 327-e. The PSE 302 may create the power availability table 327 based on the PoE port configurations in the local announce packet 323 and remote announce packet 321. An example illustration of creation of the power availability table 327 is shown below.

Consider that the PoE port configuration TLV 321-b in the remote announce packet 321 is:
{port -ge-0/0/0, PD identifier=floor5-1, port priority=high, Power consumed=11.5 W, Power Class=3};
{port -ge-0/0/7, PD identifier=floor5-2, port priority=high, Power consumed=11.5 W, Power Class=3}
Further, consider that the PoE port configuration TLV 323-b in the local announce packet 323 is:
{port -ge-0/0/6, PD identifier=floor5-1, port priority=high, Power consumed=11.5 W, Power Class=3};
{port -ge-0/0/3, PD identifier=floor5-2, port priority=high, Power consumed=11.5 W, Power Class=3}
{port -ge-0/0/1, PD identifier=floor5-5, port priority=high, Power consumed=9 W, Power Class=2}
From the above PoE port configuration TLV 321-b and PoE port configuration 323-b, the PSE 302 may determine that the PDs with PD identifiers "floor5-1" and "floor5-2" are connected to both the PSE 302 and the additional PSE 304. Accordingly, the PSE 302 mat create the following power availability table for the PDs "floor5-1" and "floor5-2" as below.
Power Availability Table:

| PD Identifier | Principal PSE port id and priority | Auxiliary PSE port id and priority | Power consumed | Power Class |
|---|---|---|---|---|
| Floor5-1 | ge-0/0/0 "High" | ge-0/0/6 "High" | 11.5 | 3 |
| Floor5-2 | ge-0/0/7 "High" | ge-0/0/3 "High" | 11.5 | 3 |

Thus, the power availability table may be created for both PDs "Floor5-1" and "Floor5-2", each of which are connected to both the PSE 302 and the additional PSE 304. The additional PSE 304 may store the copy of the power availability table on receiving the same from the PSE 302.

The PSE 302 may periodically update the local announce packet and periodically receive updates of the remote announce communication from the additional PSE 304. Based on these updates, the PSE 302 may update the power availability table 325. The PSE 302 may compare the power availability table 325 with its updated version to identify any changes in the power availability table. Thus, at block 328, the PSE 302 may check whether there is a change in the power availability table. In response to identifying that there is a change in the power availability table, the PSE 302 may detect that an event has occurred. Although not shown in FIG. 3, in response to occurrence of the event, the PSE 302 may send an "event notification" to the additional PSE 304. The "event notification" packet may refer to a message sent by a PSE to another PSE using IPCP over TCP, where the "event notification" packet comprises details related to the event. In an example, the event notification may be sent by the PSE 302 to the additional PSE 304 via IPCP over TCP. The "event notification" packet may comprise a collection of TLVs. An example "event notification" packet is shown below.

| Source Address | PoE event | Auth info | Principal select | Packet type |
|---|---|---|---|---|

In the example "event notification" packet, the "source address" field may be similar to source address 313-a or source address 323-c, as described earlier. The "auth info" field may be similar to auth info 313-d or auth info 323-c, as described earlier. Similarly, the "principal select" field may be similar to principal select 313-e or principal select 323-d, as described earlier. The "PoE event" TLV may provide an indication to a type of the event occurred. For example, the "PoE event" TLV may indicate that the event occurred is a "firmware update", "port configuration change", "PSU configuration change", "scheduled maintenance", "reboot", etc. The "packet type" TLV may indicate that this particular packet is an "event notification" packet.

Further, In response to identifying that there is a change in the power availability table ("Yes" branch from block 328), the PSE 302 may analyze the power availability table to identify the change. In some examples, port priority of a PoE capable port of the PSE 302 connected to the PD 306 may be decreased, i.e., from "high" to "low". In other examples, the port priority of a PoE capable port of the PSE 302 connected to the PD 306 may be increased, i.e., from "low" to "high". The PSE 302 may identify these changes in the port priority from the power availability table. For the purpose of the present discussion, consider that the port priority of the PoE capable port of the PSE 302 is reduced. At block 330, the PSE 302 identifies that the change in the power availability table corresponds to a reduction in port priority of a PoE capable port of the PSE 302 connected to the PD 306. In an example, the port priority of the PoE capable port of the PSE 302 may be changed from "high" to "low". Subsequently, at block 332, the PSE 302 may check whether a PoE capable port of the additional PSE 304 connected to the PD 306 has a "High" priority. In response to determining that the PoE capable port of the additional PSE 304 connected to the PD 306 has the "high" priority ("Yes" branch from block 332), the PSE 302 may send a control communication to additional PSE 304, at block 334. In an example, the control communication is a transport layer protocol communication indicative of a request to the additional PSE 304 to increase the power allotment of the additional PSE 304 for the PD 306. In response to determining that the port of the additional PSE 304 does not have the high priority ("No" branch from block 332), at block 336, the PSE 302 may send a control communication to the additional PSE 304 indicating the additional PSE to increase port priority of the port connected to the PD 306.

In response to determining that there is no change in the power availability table ("No" branch from block 328), the PSE 302 may check whether there is a change in number of PSUs connected to the PSE 302, at block 338. In an example, the PSE 302 may compare the first communication, such as the first communication 313 with a subsequent first communication which may be an update to the first communication 313 to identify the change. The PSE 302 may compare a version of the PoE capabilities TLV 313-b with another version of the PoE capabilities field generated after a predefined time. Depending on the comparison, the PSE 302 may identify any changes in the number of PSUs or PSU configuration. In an example, a change in the number of PSUs or PSU configuration may include one of multiple PSUs connected to the PSE 302 being disconnected or one PSU going offline, or a change in power redundancy configuration. Similarly, by checking the first communication 313, at block 338, the PSE 302 may also identify if there is a change in power budget at the PSE 302. In an example, a change in the power budget may include increase in the base power reserved, increase in non-PoE power consumption, or reduction in total power allocated for PoE. A change in the PSU configuration or a change in the power budget may indicate a change in the ability of the PSE 302 to supply PoE to the PD 306. In some examples, in response to detecting a change in the number of PSUs or the power budget of PSE 302, the PSE 302 may send an "event notification" packet to the additional PSE 304. The "event notification" packet may be similar to the "event notification" packet described earlier.

Further, in response to detecting a change in the number of PSUs or the power budget of PSE 302 ("Yes" branch from block 338), the PSE 302 may send a control communication to additional PSE 304, at block 334. In an example, the control communication is a transport layer protocol communication via IPCP indicative of a request to the additional PSE 304 to increase the power allotment of the additional PSE 304 for the PD 306. In response to receiving the control communication, the additional PSE may honor the request and increase the power allotment of the additional PSE 304 for the PD 306, at block 340. Thus, based on a change in the power availability table or a change in ability of the PSE to provide power to the PD, the PSE may send communications to the additional PSE requesting to adjust its power allotment for the PD. The additional PSE 304 which is now aware of the PoE availability for the PD at the PSE 302 may consequently adjust the PoE power allotment for the PD thereby preventing failures in the PD due to power shortage. This allows efficient allocation of PoE for the PD by the PSE and the additional PSE.

In response to determining that there is no change in the power availability table ("No" branch from block 328) and that there is no change in the number of PSUs, PSU configuration, or power budget of PSE 302 ("No" branch from block 338), the PSE 302 may check whether keep alive communications are received from the additional PSE 304, at block 344. Although the operations in blocks 328, 338, and 344 are shown to be performed sequentially one after another in the example of FIG. 3, in another example, the operations in blocks 328, 338, and 344 may be executed in parallel by the PSE 302. In an example, the keep alive communications are IPCP keep alive messages.

In an example, the PSE 302 may have a scheduled maintenance activity, such as a firmware upgrade, during which, the PSE 302 may continue to exchange keep alive communications with the additional PSE 304. The PSE 302 may send an "event notification" to the additional PSE 304 indicating that the PSE 302 has the firmware upgrade scheduled. As mentioned earlier, the "event notification" is sent from the PSE 302 to the additional PSE 304 using IPCP over TCP. The "event notification" may comprise a "PoE event" TLV indicating an upcoming firmware upgrade for PSE 302. On receiving this "event notification" from the PSE 302, the additional PSE 304 may instruct the PD 306 (via link layer protocol communications) to draw more power from the additional PSE 304 and consequently may also allot more power for the PD 306. The PD 306 may acknowledge the additional PSE 304 that it will now draw more power from the additional PSE 304. Subsequently, the additional PSE 304 may send an acknowledgement to the PSE 302, indicating the PSE 302 to go for the firmware upgrade. In an example, the PSE 302 may keep scheduled maintenance operation on hold unless the acknowledgement is received from the additional PSE 304. On receiving the acknowledgement from the additional PSE 304, the PSE 302 may go for the scheduled maintenance. After completion of the scheduled maintenance activity, the PSE 302 and the additional PSE 304 may return to their respective "IPCP peer established" state.

In another example, the PSE 302 may be "reboot" or a PoE port of the PSE 302 connected to the PD may be shut down, during which, the PSE 302 may be unable to exchange keep alive communications with the additional PSE 304. The PSE 302 may send an "event notification" to the additional PSE 304 indicating that the PSE 302 is going to be incapable to exchange keep alive communications after a time period. The "event notification" may comprise a "PoE event" TLV indicating an upcoming reboot/PoE port shutdown for PSE 302. On receiving this "event notification" from the PSE 302, the additional PSE 304 may instruct the PD 306 (via link layer protocol communications) to draw more power from the additional PSE 304 and consequently may also allot more power for the PD 306. The PD 306 may acknowledge the additional PSE 304 that it will now draw more power from the additional PSE 304. Subsequently, the additional PSE 304 may send an acknowledgement to the PSE 302, indicating the PSE 302 to go for the reboot/port shutdown. In an example, the PSE 302 may keep the "reboot/port shutdown" operation on hold unless the acknowledgement is received from the additional PSE 304. On receiving the acknowledgement from the additional PSE 304, the PSE 302 may go for the reboot/port shutdown. Once the PSE 302 goes for a reboot/port shutdown, keep alive communications between the PSE and the additional PSE 304 may be stopped. After the PSE 302 reboots/the port is back online, the PSE 302 and the additional PSE 304 may re-initiate discovery, such as at block 312.

In some examples, after a predefined keepalive retries by the PSE 302, if no keep alive communication is received from the additional PSE 304 ("No" branch from block 344), the PSE 302 may detect that the additional PSE 304 is unable to exchange transport layer protocol communications with the PSE 302. Thus, the PSE 302, at block 346, may send a first link layer protocol communication to the PD 306 indicating that the additional PSE 304 is going for maintenance activity, or firmware update, or a reboot of the additional PSE 304. In response to receiving a keep alive communication from the additional PSE 304 within the predefined keep alive retries ("Yes" branch from block 344), the PSE 302 may continue to monitor keep alive communications and the power availability table, at block 348.

After sending the first link layer protocol communication to the PD 306, the PSE 302 may send a second link layer protocol communication to the PD 306 to adjust power draw of the PD 306, at block 350. The second link layer protocol communication may comprise a recommendation to the PD 306 to lower its power draw such that the PoE power allotted by the PSE 302 is sufficient to continue operations of the PD 306 during the period when the additional PSE 304 is under maintenance. In an example, the PSE 302 may recommend the PD 306 to operate in a power saver mode to lower the power draw. In response to receiving the recommendation, the PD 306 may advertise to the additional PSE 304, a "minimum power" required for operation in the power saver mode. The "minimum power" refers to a minimum threshold of power that is necessary for continuing routine operations of the PD 306 in a low power/power saver mode. If the additional PSE 304 acknowledges that it can provide the "minimum power" over PoE to the PD, the PoE may initiate operation in the power save mode. Thus, based on the recommendation in the second link layer protocol communication, the PD 306 may adjust the power draw at block 352. At block 354, the PD 306 may send a link layer protocol communication to draw power from the PSE 302 based on the adjusted PD power draw. Thus, the PD 306 may continue its operations although the additional PSE 304 may be under maintenance. Based on the link layer protocol communication form the PD 306 to the PSE 302, the PSE 302 may modify a power allotment of the PSE 302 for the PD 306. In an example, the adjustment in power allotment may include increasing the total PoE power allocated for a PoE capable port of the PSE 302 connected to the PD 306. Thus, the PD 306 may continue to operate without interruptions even though there may be a change in PoE configuration of the PSE 302 or the additional PSE 304, a change in ability of the PSE 302 to supply PoE to the PD 306, or the additional PSE 304 going for a maintenance activity, firmware upgrade, or reboot.

Figure 4:
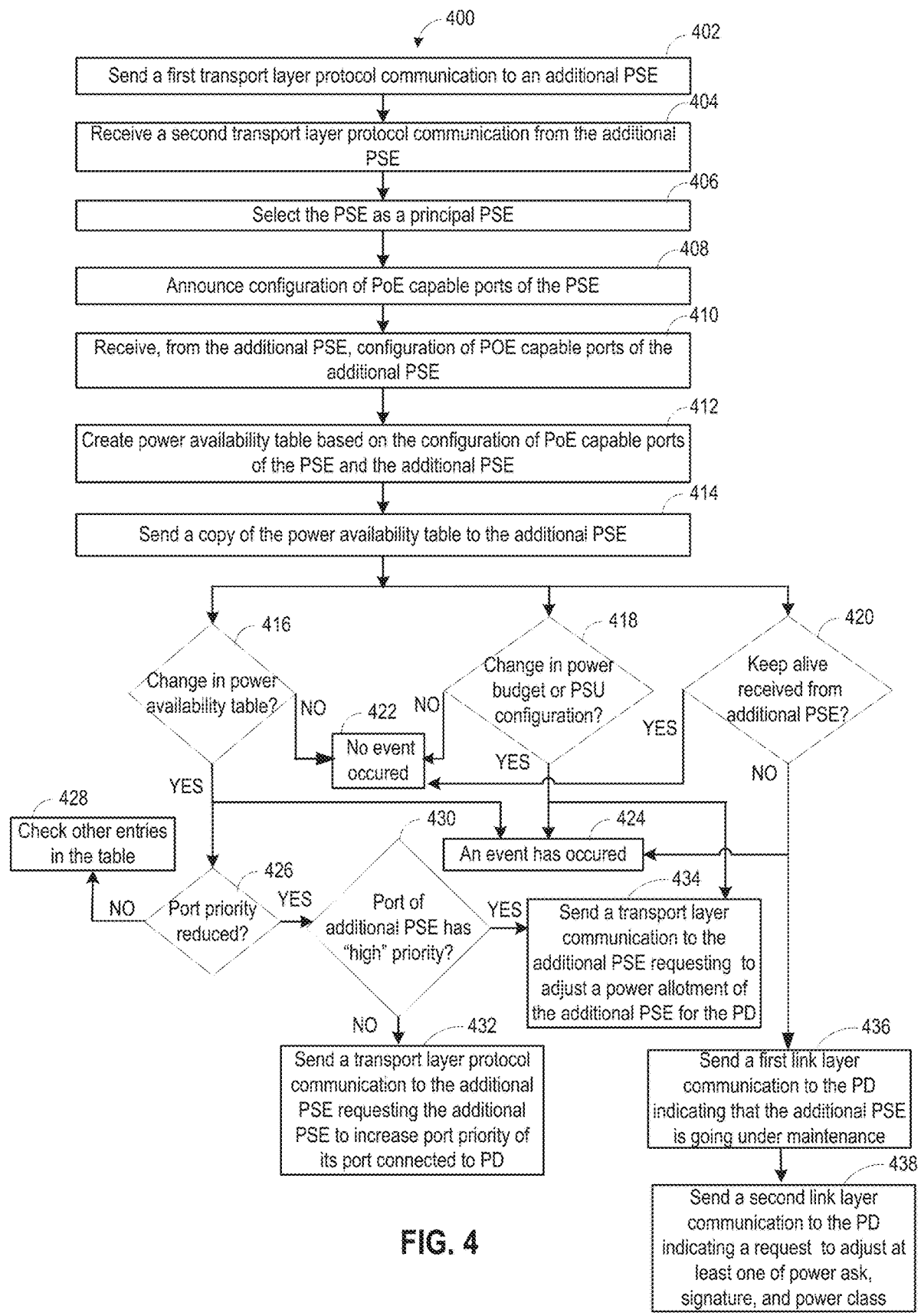
FIG. 4 is a process flow diagram illustrating a method executable by a PSE in a PoE system, according to an example.
Figure 5:
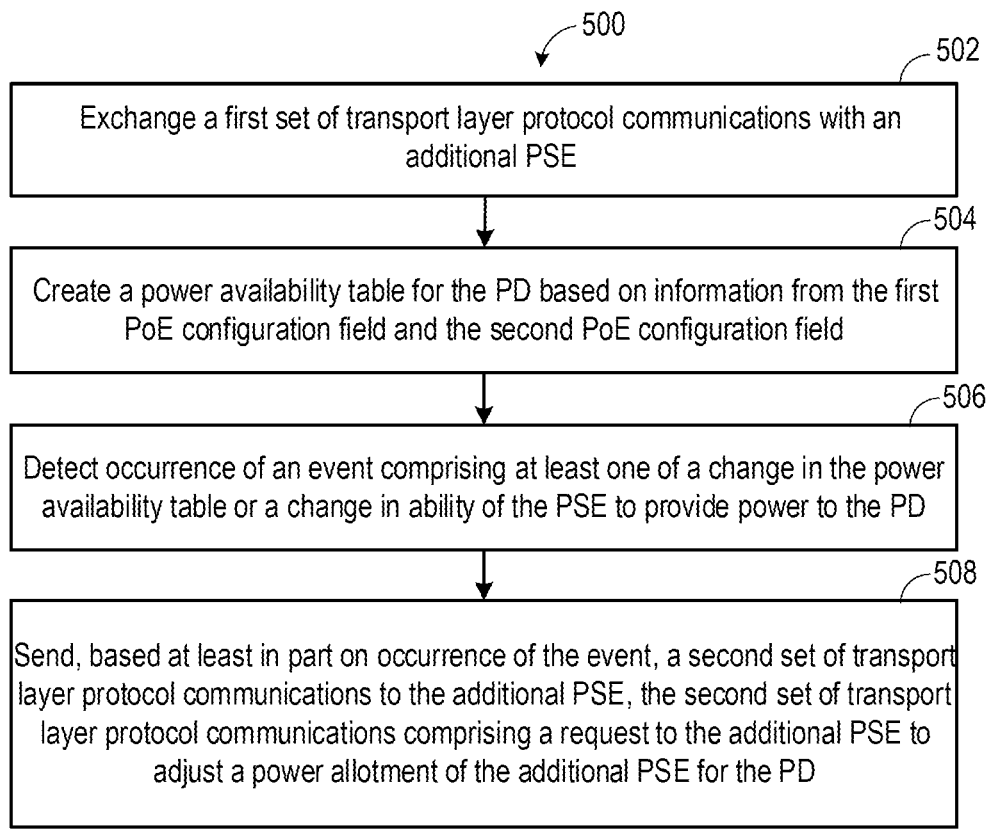
FIG. 5 is another process flow diagram illustrating a method performable by a PSE in a PoE system, according to an example.

Turning now to FIGS. 4 and 5 example methods 400 and 500 will be described. The methods 400 and 500 may be performed, for example, by a PSE, such as the PSE 105 of FIG. 1 or the PSE 302 of FIG. 3, described above. In particular, in some examples, the methods 400 and/or 500 may be performed by control circuitry 130 of the PSE 105. In some examples, the control circuitry 130 comprises a computer readable storage medium storing instructions corresponding to the operations of methods 400 and/or 500, i.e., instructions configured to cause the PSE 105 to perform the methods 400 and/or 500 when executed by a processor of the control circuitry 130. In some examples, the control circuitry 130 comprises a dedicated hardware configured to perform the methods 400 and/or 500. In some examples, the control circuitry 130 is configured to perform the methods 400 and/or 500 by a combination of a processor executing instructions and dedicated hardware.

As shown in FIG. 4, the method 400 comprises operations of blocks 402 to 438, which are described in greater detail below.

In block 402, the PSE may send a first transport layer protocol communication to an additional PSE. The PSE and the additional PSE are connectable via respective PoE capable ports to a PD. The first communication from the PSE to the additional PSE comprises a first PoE configuration field indicative of a PoE configuration of the PSE. The first communication is a transport layer protocol communication which may be an ethernet frame comprising a source address and TLVs carrying information. The first PoE configuration field may be one of the TLVs. In an example, the PSE may send the first communication to a management IP address of the additional PSE. In an example, the PoE configuration of the PSE comprises PoE capabilities of the PSE. The PoE capabilities of the PSE comprise at least one of a power budget of the PSE, a firmware version of the PSE, or a configuration of power supply units (PSUs) of the PSE. Although illustrated first for ease of description, block 402 is not necessarily performed first; for example, block 402 may be performed at any time prior to block 410, or concurrently with, block 404. In some examples, the communication sent in block 402 may be a subsequent communication; for example, the PSE may send transport layer protocol communications periodically to the additional PSE and block 402 may comprise one such communication.

In an example, after receiving the first communication, the additional PSE may determine whether it has capabilities to exchange transport layer protocol communications with the PSE. In response to determining that the additional PSE has the capabilities to exchange transport layer protocol communications, in block 404, the PSE may receive a second communication from the additional PSE to the PSE. The second communication comprises a second PoE configuration field indicative of a PoE configuration of the additional PSE. The second communication is a transport layer protocol communication which may be an ethernet frame comprising a source address and TLVs carrying information. The second PoE configuration field may be one of the TLVs. In an example, the PSE may receive the first communication from the management IP address of the additional PSE. In an example, the PoE configuration of the additional PSE comprises PoE capabilities of the additional PSE. The PoE capabilities of the additional PSE comprise at least one of a power budget of the additional PSE, a firmware version of the additional PSE, or a configuration of PSUs of the additional PSE. In some examples, the communication received in block 404 may be a subsequent communication; for example, the additional PSE may send transport layer protocol communications periodically to the PSE and block 404 may comprise one such communication. Thus, the PSE and the additional PSE may exchange a set of transport layer protocol communications comprising the first communication and the second communication.

In block 406, based on the first communication and the second communication the PSE may be selected as the principal PSE and the additional PSE may be selected as an auxiliary PSE. Once selected as the principal PSE, the PSE may announce configuration of PoE capable ports of the PSE, in block 408. In an example, the configuration of the PoE capable ports of the PSE comprises at least one of: a number of PoE capable ports, respective power allocations of the PoE capable ports, respective power consumption amounts of the PoE capable ports, respective port priorities of the PoE capable ports, or respective statuses of the PoE capable ports of the PSE. In some examples, the PSE may send the configuration of the PoE capable ports within the first communication. Thus, in some examples, the announcement in block 408 may be part of the first communication at block 402, where the PSE may send transport layer protocol communication comprising configuration of the PoE capable ports of the PSE to the additional PSE.

In block 410, the PSE may receive, from the additional PSE, configuration of POE capable ports of the additional PSE. In an example, the configuration of the PoE capable ports of the additional PSE comprises at least one of: a number of PoE capable ports, respective power allocations of the PoE capable ports, respective power consumption amounts of the PoE capable ports, respective port priorities of the PoE capable ports, or respective statuses of the PoE capable ports of the additional PSE. In some examples, the additional PSE may send the configuration of the PoE capable ports of the additional PSE within the second communication. Thus, in some examples, the communication in block 408 may be part of the second communication received at block 404, where the PSE may receive transport layer protocol communication comprising configuration of the PoE capable ports of the additional PSE from the additional PSE.

In block 412, the PSE may create a power availability table from the configuration of the PoE capable ports of the PSE and configuration of the PoE capable ports of the additional PSE. In an example, the configuration of the PoE capable ports of the PSE and that of the additional PSE may be obtained from the first and second PoE configuration fields in the first and second communications exchanged between the PSE and the additional PSE in blocks 402 and 404. Thus, the power availability table may be created based on information from the first PoE configuration field and the second PoE configuration field.

In block 414, the PSE may send a copy of the power availability table to additional PSE which stores the same. In some examples, the blocks 408, 410, and 412 may be periodically repeated. That is any changes in configuration of the PoE capable ports of the PSE or the additional PSE may be included in an updated version of the power availability table. The entries in the power availability table may be compared with entries in the updated version of the power availability table to check, in block 416, whether there is a change in the power availability table.

Further, in some examples, the blocks 402 and 404 may be periodically repeated. The first communication may be compared with a subsequent first communication to check for any changes between the first PoE configuration field in the first communication and that in the subsequent first communication. Likewise, the second communication may be compared with a subsequent second communication to check for any changes between the second PoE configuration field in the second communication and that in the subsequent second communication. Based on this, in block 418, the PSE may check whether there is a change in power budget or PSU configuration.

In block 420, the PSE may check whether it has received keep alive communications from the additional PSE. As shown in FIG. 3, the operations in blocks 416, 418, and 420 may be performed simultaneously. In another example, the operations in blocks 416, 418, and 420 may be performed sequentially one after another. On detecting that there is no change in the power availability table ("No" branch from block 416), the PSE may determine that no event has occurred, in block 422. Likewise, on detecting that there is no change in the power budget or PSU configuration ("No" branch from block 418), the PSE may determine that no event has occurred, in block 422. Also, on detecting that a keep alive communication is received from the additional PSE in a keep alive interval ("YES" branch from block 420), the PSE may determine that no event has occurred, in block 422.

In response to determining that there is a change in the power availability table ("YES" branch from block 416), in block 424, the PSE may determine that an event has occurred. Also, in response to determining that there is a change in the power budget or PSU configuration ("YES" branch from block 418), in block 424, the PSE may determine that an event has occurred. Likewise, in response to determining that there no keep alive communication is received in the keep alive interval ("NO" branch from block 420), in block 424, the PSE may determine that an event has occurred. In an example, the event comprises at least one of a change in the power availability table or a change in ability of the PSE to provide power to the PD. In response to detecting occurrence of the event, the PSE may send a transport layer protocol communication to the additional PSE intimating the occurrence of the event. The transport layer protocol communication comprises a TLV identifying a type of the event, such as a scheduled maintenance, a change in configuration of PoE capable ports of the PSE or the additional PSE leading to a change in the power availability table, a change in power budget or PSU configuration of the PSE.

Further, in response to determining that there is change in the power availability table ("YES" branch from block 416), in block 426, the PSE may check whether port priority of a port of the PSE connected to the PD is reduced. Reduction in port priority comprises changing the port priority from "Critical" to "High" or from "High" to "Low", where a "Critical" priority corresponds to a highest priority of a PoE capable port and "Low" corresponds to a lowest priority of a PoE capable port. In response to determining that the port priority has not been reduced ("No" branch from block 426), the PSE may check, in block 428, for a change in other entries in the power availability table, such as, power class and PoE power consumed. In response to determining that the port priority has been reduced ("Yes" branch from block 426), the PSE checks, in block 430, whether port of the additional PSE connected to the PD has "high" priority. In response to determining that the port of the additional PSE connected to the PD does not have "high" priority, the PSE, in block 432, sends a transport layer protocol communication to the additional PSE. The transport layer protocol communication may comprise a request to the additional PSE to increase port priority of the port of the additional PSE connected to PD. In response to determining that the port of the additional PSE connected to the PD has "high" priority, the PSE, in block 434, sends another transport layer protocol communication to the additional PSE. The other transport layer protocol communication comprises a request to the additional PSE to adjust a power allotment of the additional PSE for the PD. In an example, adjusting the power allotment of the additional PSE for the PD comprises increasing the power allotment of the additional PSE for the PD. Further, in response to determining that there is a change in power budget or PSU configuration of the of the PSE ("YES" branch from block 418), the PSE, in block 434, sends the other transport layer protocol communication to the additional PSE, where the other transport layer protocol communication comprises a request to the additional PSE to adjust a power allotment of the additional PSE for the PD.

In response to determining that the keep alive communication is not received from the from the additional PSE over successive keep alive intervals ("NO" branch from block 420), in block 436, the PSE sends a first link layer communication to the PD indicating that the additional PSE is going under maintenance. In block 438, the PSE sends a second link layer communication to the PD. The second link layer communication comprises a request to adjust at least one of power ask, signature, and power class of the PD.

As shown in FIG. 5, the method 500 comprises operations of blocks 502, to 508. The method 500 comprises a modification of the method 400.

In block 502, the PSE exchanges a first set of transport layer protocol communications with an additional PSE. The additional PSE comprises a port connectable via a communications link to a PD to supply power to and exchange communications with the PD. The additional PSE is also connected to the PD to provide PoE to the PD. The first set of transport layer protocol communications comprise a first communication from the PSE to the additional PSE and a second communication from the additional PSE to the PSE. The first communication comprises a first PoE configuration field indicative of a PoE configuration of the PSE and the second communication comprises a second PoE configuration field indicative of a PoE configuration of the additional PSE.

In block 504, the PSE creates a power availability table for the PD based on information from the first PoE configuration field and the second PoE configuration field. The power availability table is indicative of availability of PoE for the PD from the PSE and the additional PSE.

In block 506, the PSE detects occurrence of an event comprising at least one of a change in the power availability table or a change in ability of the PSE to provide power to the PD.

In block 508, the PSE sends, based at least in part on occurrence of the event, a second set of transport layer protocol communications to the additional PSE. The second set of transport layer protocol communications comprise a request to the additional PSE to adjust a power allotment of the additional PSE for the PD.

Figure 6:
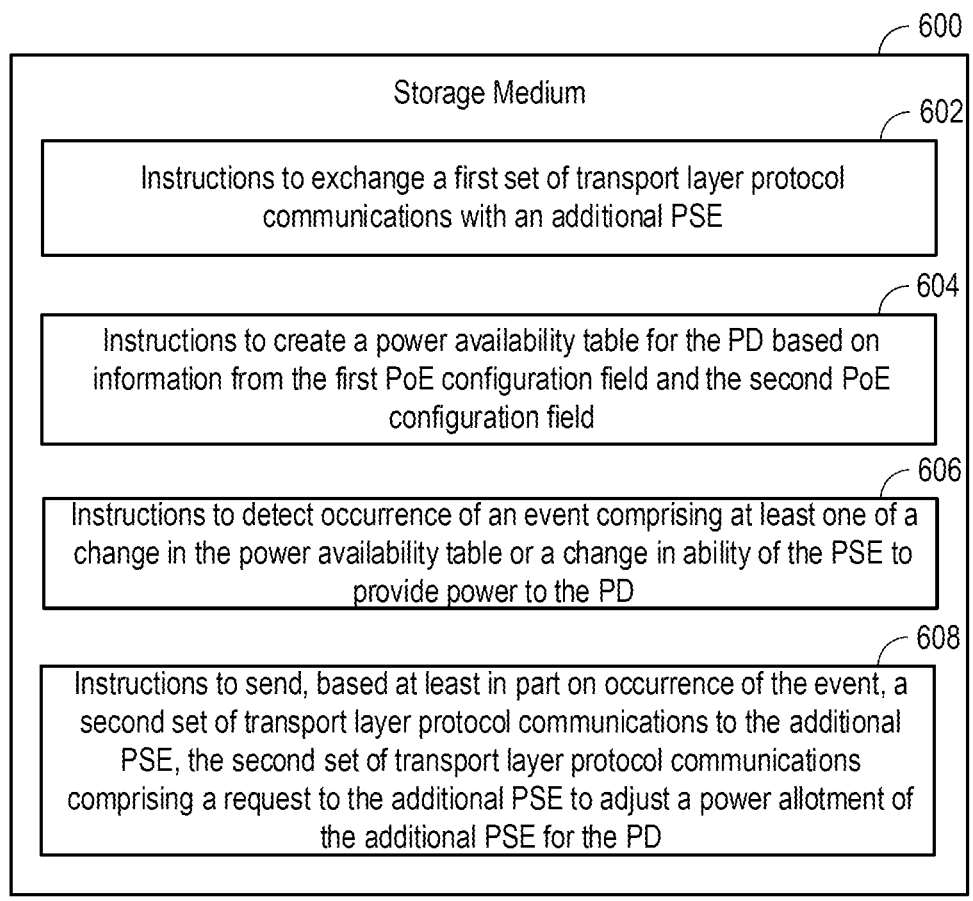
FIG. 6 is a block diagram illustrating a storage medium storing instructions executable by a processor of a PSE, according to an example.

Turning now to FIG. 6, an example non-transitory computer readable storage medium 600 (storage medium 600) is described. The storage medium 600 stores instructions 602 to 608, which are executable by a processor of a PSE (e.g., a processor of control circuitry 130 of PSE 105 of FIG. 1) to cause the PSE to perform various operations described herein. In some examples, the storage medium 600 is part of a PSE, such as the PSE 105. For example, in some implementations the storage medium 600 is part of the control circuitry 130, and the control circuitry 130 further comprises a processor coupled to the storage medium 600 and configured to read and execute the instructions 602 to 608. In some implementations, the storage medium 600 may be provided as a computer program product that is, at least initially, separate from a PSE. The computer program product may be usable to program a PSE to perform operations associated with the instructions 602 to 608 by, for example, transmitting the instructions 602 to 608 from the storage medium 600 to the PSE, either for copying to local storage on the PSE or for immediate execution by the PSE.

The instructions 602 comprise instructions to exchange a first set of transport layer protocol communications with an additional PSE. The additional PSE is connected to the PD to provide PoE to the PD. The first set of transport layer protocol communications comprise a first communication from the PSE to the additional PSE comprising a first PoE configuration field indicative of a PoE configuration of the PSE and a second communication from the additional PSE to the PSE comprising a second PoE configuration field indicative of a PoE configuration of the additional PSE. In an example, the instructions 602 may include instructions to perform the operation 135 and other associated operations as described above in relation to the PSE 105 in FIG. 1. The instructions 602 may also include operations described above in relation to blocks 402, 404 of the method 400 and block 502 of the method 500.

The instructions 604 comprise instructions to create a power availability table for the PD based on information from the first PoE configuration field and the second PoE configuration field, where the power availability table is indicative of availability of PoE for the PD from the PSE and the additional PSE. For example, the instructions 604 may include instructions to perform the operation 140 and other associated operations described above in relation to the PSE 105 in FIG. 1. The instructions 604 may also include operations described above in relation to blocks 408, 410, 412, and 414 of the method 400, and/or block 504 of the method 500.

The instructions 606 comprise instructions to detect occurrence of an event comprising at least one of a change in the power availability table or a change in ability of the PSE to provide power to the PD. For example, the instructions 606 may include instructions to perform the operation 150 and other associated operations described above in relation to the PSE 105 in FIG. 1. The instructions 606 may also include operations described above in relation to blocks 416, 418 and 420 of the method 400, and/or block 506 of the method 500.

The instructions 608 comprise instructions to send, based at least in part on occurrence of the event, a second set of transport layer protocol communications to the additional PSE, the second set of transport layer protocol communications comprising a request to the additional PSE to adjust a power allotment of the additional PSE for the PD. For example, the instructions 608 may include instructions to perform the operation 155 and other associated operations described above in relation to the PSE 105 in FIG. 1. The instructions 608 may also include operations described above in relation to blocks 430 and 432 of the method 400, and/or block 508 of the method 500.

Figure 7:
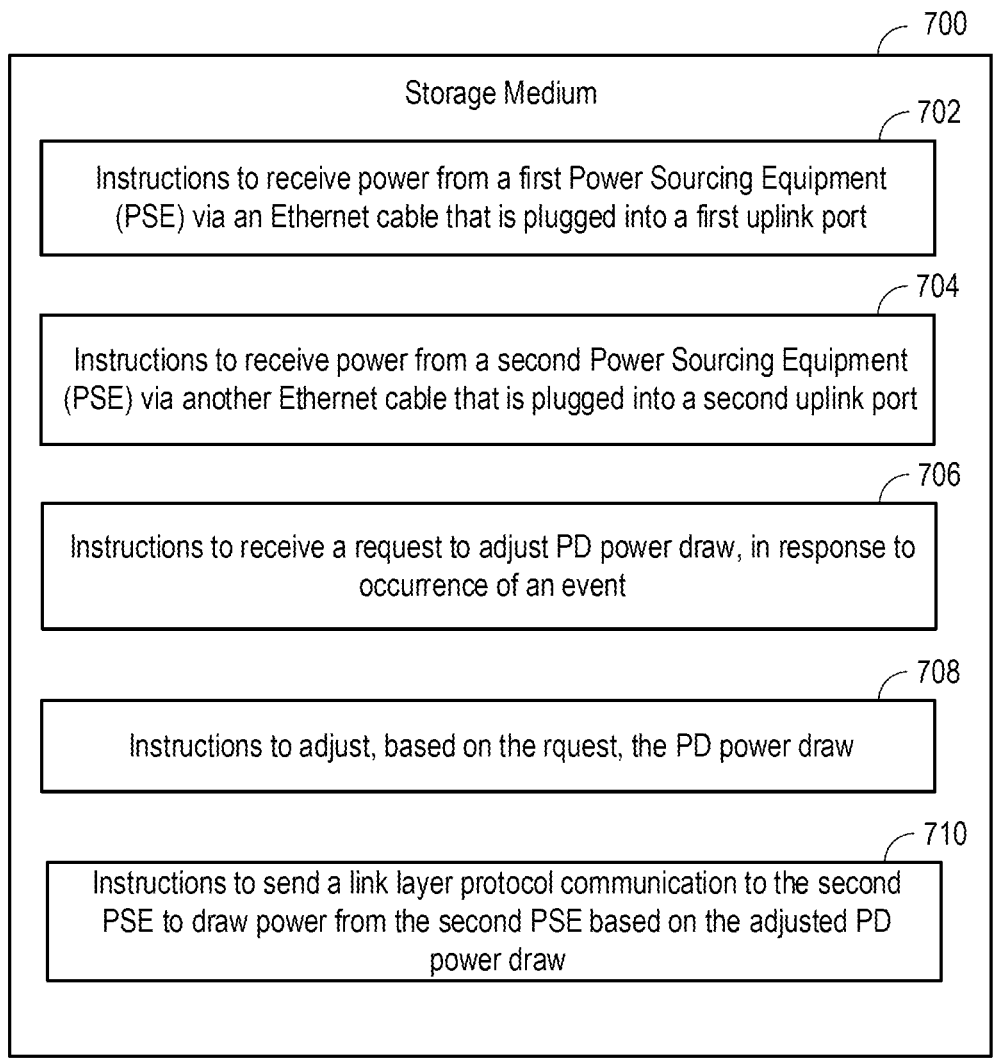
FIG. 7 is a block diagram illustrating a storage medium storing instructions executable by a processor of a PD, according to an example.

Turning now to FIG. 7, an example non-transitory computer readable storage medium 700 (storage medium 700) is described. The storage medium 700 stores instructions 702 to 710, which are executable by a processor of a PD (e.g., a processor of the control circuitry 220 of PD 200) to cause the PD to perform various operations described herein. In some examples, the storage medium 700 is part of a PD, such as the PD 200. For example, in some implementations the storage medium 700 is part of the control circuitry 220, and the control circuitry 220 further comprises a processor coupled to the storage medium 700 and configured to read and execute the instructions 702 and 704. In some implementations, the storage medium 700 may be provided as a computer program product that is, at least initially, separate from a PD. The computer program product may be usable to program a PD to perform operations associated with the instructions 702 and 704 by, for example, transmitting the instructions 702 and 704 from the storage medium 700 to the PD for copying to local storage on the PD or for immediate execution by the PD.

The instructions 702 comprise instructions to receive power from a first PSE via an Ethernet cable that is plugged into a first uplink port of the PD. The instructions 702 may comprise instructions to perform the operation 202 and other associated operations described above in relation to the PD 200 in FIG. 2.

The instructions 704 comprise instructions to receive power from a second PSE via another ethernet cable that is plugged into a second uplink port. The instructions 704 may comprise instructions to perform the operations 224 and other associated operations described above in relation to the PD 200 in FIG. 2.

The instructions 706 comprise instructions to receive a first link layer protocol communication from the first PSE, in response to occurrence of an event comprising at least one of a change in a power availability table of the PD or a change in ability of the PSE to provide power to the PD. The first link layer protocol communication is indicative of a request to adjust PD power draw. The instructions 706 may comprise instructions to perform the operations 226 and other associated operations described above in relation to the PD 200 in FIG. 2.

The instructions 708 comprise instructions to adjust, based on the first link layer protocol communication, the PD power draw. The instructions 708 may comprise instructions to perform the operations 228 and other associated operations described above in relation to the PD 200 in FIG. 2.

The instructions 710 comprise instructions to send a second link layer protocol communication to the second PSE to draw power from the second PSE based on the adjusted PD power draw. The instructions 710 may comprise instructions to perform the operations 230 and other associated operations described above in relation to the PD 200 in FIG. 2.

In the description above, various types of electronic circuitry are described. As used herein, "electronic" is intended to be understood broadly to include all types of circuitry utilizing electricity, including digital and analog circuitry, direct current (DC) and alternating current (AC) circuitry, and circuitry for converting electricity into another form of energy and circuitry for using electricity to perform other functions. In other words, as used herein there is no distinction between "electronic" circuitry and "electrical" circuitry.

It is to be understood that both the general description and the detailed description provide examples that are explanatory in nature and are intended to provide an understanding of the present disclosure without limiting the scope of the present disclosure. Various mechanical, compositional, structural, electronic, and operational changes may be made without departing from the scope of this description and the claims. In some instances, well-known circuits, structures, and techniques have not been shown or described in detail in order not to obscure the examples. Like numbers in two or more figures represent the same or similar elements.

In addition, the singular forms "a", "an", and "the" are intended to include the plural forms as well, unless the context indicates otherwise. Moreover, the terms "comprises", "comprising", "includes", and the like specify the presence of stated features, steps, operations, elements, and/or components but do not preclude the presence or addition of one or more other features, steps, operations, elements, components, and/or groups. Components described as coupled may be electronically or mechanically directly coupled, or they may be indirectly coupled via one or more intermediate components, unless specifically noted otherwise. Mathematical and geometric terms are not necessarily intended to be used in accordance with their strict definitions unless the context of the description indicates otherwise, because a person having ordinary skill in the art would understand that, for example, a substantially similar element that functions in a substantially similar way could easily fall within the scope of a descriptive term even though the term also has a strict definition.

And/or: Occasionally the phrase "and/or" is used herein in conjunction with a list of items. This phrase means that any combination of items in the list—from a single item to all of the items and any permutation in between—may be included. Thus, for example, "A, B, and/or C" means "one of {A}, {B}, {C}, {A, B}, {A, C}, {C, B}, and {A, C, B}".

Elements and their associated aspects that are described in detail with reference to one example may, whenever practical, be included in other examples in which they are not specifically shown or described. For example, if an element is described in detail with reference to one example and is not described with reference to a second example, the element may nevertheless be claimed as included in the second example.

Unless otherwise noted herein or implied by the context, when terms of approximation such as "substantially," "approximately," "about," "around," "roughly," and the like, are used, this should be understood as meaning that mathematical exactitude is not required and that instead a range of variation is being referred to that includes but is not strictly limited to the stated value, property, or relationship. In particular, in addition to any ranges explicitly stated herein (if any), the range of variation implied by the usage of such a term of approximation includes at least any inconsequential variations and also those variations that are typical in the relevant art for the type of item in question due to manufacturing or other tolerances. In any case, the range of variation may include at least values that are within +1% of the stated value, property, or relationship unless indicated otherwise.

Further modifications and alternative examples will be apparent to those of ordinary skill in the art in view of the disclosure herein. For example, the devices and methods may include additional components or steps that were omitted from the diagrams and description for clarity of operation. Accordingly, this description is to be construed as illustrative only and is for the purpose of teaching those skilled in the art the general manner of carrying out the present teachings. It is to be understood that the various examples shown and described herein are to be taken as exemplary. Elements and materials, and arrangements of those elements and materials, may be substituted for those illustrated and described herein, parts and processes may be reversed, and certain features of the present teachings may be utilized independently, all as would be apparent to one skilled in the art after having the benefit of the description herein. Changes may be made in the elements described herein without departing from the scope of the present teachings and following claims.

It is to be understood that the particular examples set forth herein are non-limiting, and modifications to structure, dimensions, materials, and methodologies may be made without departing from the scope of the present teachings.

Other examples in accordance with the present disclosure will be apparent to those skilled in the art from consideration of the specification and practice of the invention disclosed herein. It is intended that the specification and examples be considered as exemplary only, with the following claims being entitled to their fullest breadth, including equivalents, under the applicable law.

The invention claimed is:

1. A Power Sourcing Equipment (PSE) comprising:
a first port connectable via a first communications link to a powered device (PD) to supply Power over Ethernet (POE) to and exchange communications with the PD;
a second port connectable via a second communications link to an additional PSE; and
a control circuitry configured to, in a state of the PD being connected to the first port and the additional PSE being connected to the second port:
exchange a first set of transport layer protocol communications with the additional PSE, the additional PSE being connected to the PD to provide PoE to the PD, the first set of transport layer protocol communications comprising:
a first communication from the PSE to the additional PSE comprising a first PoE configuration field indicative of a PoE configuration of the PSE; and a second communication from the additional PSE to the PSE comprising a second PoE configuration field indicative of a PoE configuration of the additional PSE;

create a power availability table for the PD based on information from the first PoE configuration field and the second PoE configuration field, wherein the power availability table is indicative of availability of PoE for the PD from the PSE and the additional PSE;

detect occurrence of an event comprising at least one of a change in the power availability table or a change in ability of the PSE to provide power to the PD; and send, based at least in part on occurrence of the event, a second set of transport layer protocol communications to the additional PSE, the second set of transport layer protocol communications comprising a request to the additional PSE to adjust a power allotment of the additional PSE for the PD.

2. The PSE of claim 1, wherein to exchange the first set of transport layer protocol communications with the additional PSE, the control circuitry is configured to:
send the first communication to a management Internet Protocol (IP) address of the additional PSE; and
receive the second communication from the management IP address of the additional PSE.

3. The PSE of claim 1, wherein the PoE configuration of the PSE comprises PoE capabilities of the PSE.

4. The PSE of claim 3, wherein PoE capabilities of the PSE comprise at least one of a power budget of the PSE, a firmware version of the PSE, or a configuration of power supply units (PSUs) of the PSE.

5. The PSE of claim 1, wherein the PoE configuration of the PSE comprises a configuration of PoE capable ports of the PSE.

6. The PSE of claim 5, wherein the configuration of PoE capable ports of the PSE comprises at least one of: a number of PoE capable ports, respective power allocations of the PoE capable ports, respective power consumption amounts of the PoE capable ports, respective port priorities of the PoE capable ports, or respective statuses of the PoE capable ports.

7. The PSE of claim 1, wherein the change in ability of the PSE to provide power to the PD comprises a reduction in a number of power supply units (PSUs) connected to the PSE.

8. The PSE of claim 7, wherein the second set of transport layer protocol communications comprise a control communication to the additional PSE indicating the additional PSE to increase the power allotment of the additional PSE for the PD, in response to the reduction in the number of PSUs connected to the PSE.

9. The PSE of claim 1, wherein the change in ability of the PSE to provide power to the PD comprises a reduction in PoE power availability at the PSE.

10. The PSE of claim 9, wherein the second set of transport layer protocol communications comprise a control communication to the additional PSE indicating the additional PSE to increase the power allotment of the additional PSE for the PD, in response to the reduction in PoE power availability at the PSE.

11. The PSE of claim 1, wherein the change in the power availability table comprises a reduction in PoE port priority of a PoE capable port of the PSE connected to the PD.

12. The PSE of claim 11, wherein to send the second set of transport layer protocol communications, the control circuitry is configured to:

check, based on the power availability table, whether a port of the additional PSE connected to the PD has a high priority;
in response to determining that the port of the additional PSE does not have the high priority, send a control communication to the additional PSE indicating the additional PSE to increase port priority of the port; and
in response to determining that the port of the additional PSE has the high priority, send another control communication to the additional PSE, wherein the other control communication is indicative of a request to the additional PSE to increase the power allotment of the additional PSE for the PD.

13. The PSE of claim 1, wherein to detect occurrence of the event, the control circuitry is configured to check whether transport layer protocol communications comprising keep alive communications are received from the additional PSE.

14. The PSE of claim 1, wherein responsive to detecting the event, the control circuitry is further configured to:
send a first link layer protocol communication to the PD, the first link layer protocol communication indicative to the PD that the additional PSE is going under maintenance; and
send, a second link layer protocol communication to the PD, the second link layer protocol communication indicative of a request to the PD to adjust at least one of power ask, PD signature configuration, and PD power class such that operation of the PD is uninterrupted.

15. A method for Power over Ethernet (POE) management comprising:
exchanging, by a Power Source Equipment (PSE), a first set of transport layer protocol communications with an additional PSE, the PSE and the additional PSE being configured to provide PoE to a Powered Device (PD), the first set of transport layer protocol communications comprising:
a first communication from the PSE to the additional PSE comprising a first PoE configuration field indicative of a PoE configuration of the PSE; and
a second communication from the additional PSE to the PSE comprising a second PoE configuration field indicative of a PoE configuration of the additional PSE;
creating a power availability table for the PD based on information from the first PoE configuration field and the second PoE configuration field, wherein the power availability table is indicative of availability of PoE for the PD from the PSE and the additional PSE;
detecting occurrence of an event comprising at least one of a change in the power availability table or a change in ability of the PSE to provide power to the PD; and
sending, based at least in part on occurrence of the event, a second set of transport layer protocol communications to the additional PSE, the second set of transport layer protocol communications comprising a request to the additional PSE to adjust a power allotment of the additional PSE for the PD.

16. The method of claim 15, wherein exchanging the first set of transport layer protocol communications with the additional PSE comprises:
sending the first communication to a management Internet Protocol (IP) address of the additional PSE; and
receiving the second communication from the management IP address of the additional PSE.

17. The method of claim 15, wherein the PoE configuration of the PSE comprises PoE capabilities of the PSE.

18. The method of claim 17, wherein PoE capabilities of the PSE comprise at least one of a power budget of the PSE, a firmware version of the PSE, or a configuration of power supply units (PSUs) of the PSE.

19. A powered device (PD) comprising:
a control circuitry;
a first uplink port;
a second uplink port; and
control circuitry configured to, in a state of the first uplink port being connected to a first Power Sourcing Equipment (PSE) and the second uplink port being connected to a second PSE:
receive power from the first PSE via an Ethernet cable that is plugged into the first uplink port;
receive power from the second PSE via another Ethernet cable that is plugged into the second uplink port;
receive a first link layer protocol communication from the first PSE, in response to occurrence of an event comprising at least one of a change in a power availability table of the PD or a change in ability of the PSE to provide power to the PD, wherein the first link layer protocol communication is indicative of a request to adjust PD power draw, wherein the power availability table is indicative of availability of PoE for the PD based on PoE configuration of the first PSE and PoE configuration of the second PSE;
adjust, based on the first link layer protocol communication, the PD power draw; and
send a second link layer protocol communication to one of the PSE or the second PSE to draw power based on the adjusted PD power draw.

20. The PD of claim 19, wherein the control circuitry is configured to switch the PD from a normal mode to a power save mode in response to receiving the first link layer protocol communication.

* * * * *